(12) United States Patent
Faers et al.

(10) Patent No.: US 11,684,065 B2
(45) Date of Patent: Jun. 27, 2023

(54) OIL-BASED SUSPENSION CONCENTRATES WITH LOW GRAVITATIONAL SEPARATION AND LOW VISCOSITY

(71) Applicant: Bayer CropScience Aktiengesellschaft, Monheim am Rhein (DE)

(72) Inventors: Malcolm Faers, Duesseldorf (DE); Oliver Gaertzen, Cologne (DE); Andreas Roechling, Langenfeld (DE); Arno Ratschinski, Duesseldorf (DE)

(73) Assignee: BAYER CROPSCIENCE AKTIENGESELLSCHAFT, Monheim am Rhein (DE)

( * ) Notice: Subject to any disclaimer, the term of this patent is extended or adjusted under 35 U.S.C. 154(b) by 589 days.

(21) Appl. No.: 15/753,423

(22) PCT Filed: Aug. 16, 2016

(86) PCT No.: PCT/EP2016/069420
§ 371 (c)(1),
(2) Date: Feb. 19, 2018

(87) PCT Pub. No.: WO2017/032644
PCT Pub. Date: Mar. 2, 2017

(65) Prior Publication Data
US 2018/0235208 A1 Aug. 23, 2018

(30) Foreign Application Priority Data
Aug. 21, 2015 (EP) ..................................... 15181892

(51) Int. Cl.
| | | |
|---|---|---|
| *A01N 25/04* | (2006.01) | |
| *A01N 41/10* | (2006.01) | |
| *A01N 43/40* | (2006.01) | |
| *A01N 43/56* | (2006.01) | |
| *A01N 43/653* | (2006.01) | |
| *A01N 43/713* | (2006.01) | |
| *A01N 47/06* | (2006.01) | |
| *A01N 47/36* | (2006.01) | |
| *A01N 47/40* | (2006.01) | |
| *A01N 51/00* | (2006.01) | |
| *A01N 53/00* | (2006.01) | |

(52) U.S. Cl.
CPC ............. *A01N 25/04* (2013.01); *A01N 41/10* (2013.01); *A01N 43/40* (2013.01); *A01N 43/56* (2013.01); *A01N 43/653* (2013.01); *A01N 43/713* (2013.01); *A01N 47/06* (2013.01); *A01N 47/36* (2013.01); *A01N 47/40* (2013.01); *A01N 51/00* (2013.01); *A01N 53/00* (2013.01)

(58) Field of Classification Search
CPC ........ A01N 25/04; A01N 41/10; A01N 43/40; A01N 43/56; A01N 43/653; A01N 43/713; A01N 47/06; A01N 47/36; A01N 47/40; A01N 51/00; A01N 53/00
See application file for complete search history.

(56) References Cited

U.S. PATENT DOCUMENTS

| | | | |
|---|---|---|---|
| 4,828,723 A | 5/1989 | Cao et al. | |
| 5,176,713 A * | 1/1993 | Dixit | C11D 1/72 510/304 |
| 6,074,987 A | 6/2000 | Shafer et al. | |
| 6,165,940 A * | 12/2000 | Aven | A01N 43/90 504/118 |
| 8,623,389 B2 | 1/2014 | Richards et al. | |
| 2003/0118626 A1* | 6/2003 | Kibbee | A01N 25/04 424/417 |
| 2016/0368831 A1* | 12/2016 | Bontchev | C05F 11/00 |

FOREIGN PATENT DOCUMENTS

| | | |
|---|---|---|
| JP | S64-033268 A | 2/1989 |
| JP | S64-045500 A | 2/1989 |
| JP | 2003-210094 A | 7/2003 |
| JP | 2010-531864 A | 9/2010 |
| WO | 98/38853 A2 | 9/1998 |
| WO | 2009/004281 A2 | 1/2009 |
| WO | 2010/080891 A1 | 7/2010 |

OTHER PUBLICATIONS

PCT International Search Report for PCT/EP2016/069420, dated Oct. 5, 2016.
"Aerosil R974," Aug. 31, 2013, XP055221394.
"Aerosil 200 Hydrophilic Fumed Silica," Jul. 31, 2004, XP055220943.
"Aerosil R972," Aug. 31, 2013, XP055220944.
Carpen, et al., "Gravitational instability in suspension flow," J. Fluid Mech., (2002), vol. 472: 201-210.
Larsson, et al., "Suspension Stability; Why Particle Size, Zeta Potential and Rheology are Important," Annual Transactions of the Nordic Rheology Society, (2012), vol. 20: 209-214.

\* cited by examiner

*Primary Examiner* — Robert A Wax
*Assistant Examiner* — Danielle D Sullivan
(74) *Attorney, Agent, or Firm* — McBee Moore & Vanik IP, LLC

(57) ABSTRACT

The present invention relates to new, oil-based suspension concentrates of agrochemical active compounds, a process for the preparation of these formulations and their use for the application of the active compounds contained.

13 Claims, 1 Drawing Sheet

OIL-BASED SUSPENSION CONCENTRATES WITH LOW GRAVITATIONAL SEPARATION AND LOW VISCOSITY

CROSS-REFERENCE TO RELATED APPLICATIONS

This application is a National Stage entry of International Application No. PCT/EP2016/069420, filed Aug. 16, 2016, which claims priority to European Patent Application No. 15181892.9, filed Aug. 21, 2015.

BACKGROUND

Field

The present invention relates to new, oil-based suspension concentrates of agrochemical active compounds, a process for the preparation of these formulations and their use for the application of the active compounds contained.

Description of Related Art

Numerous anhydrous and oil-based suspension concentrates of agrochemical active compounds have already been disclosed. These however have the property that with time gravitational sedimentation (separation) of the dispersed active ingredient tends to occur resulting in dense sediments that can be hard to re-homogenise. This can be minimised by the addition of rheological modifiers. However, the amount of rheological modifier required to reduce gravitational separation to a sufficiently low level of e.g. less than 5% over 6 months is usually such that a large increase in the viscosity (here defined at a shear rate of 20 $s^{-1}$) arises. This is unfavourable since it results in a product that can be hard to empty from the pack and a product which disperses poorly in the spray tank.

Alternatively, a rheological modifier can be left out and the dispersed active ingredient particles allowed to sediment. Depending on the design of the formulation, the sediment can remain sufficiently uncompressed such that it can be re-homogenised by shaking the pack. However, this is still unfavourable since the sediment also has a high viscosity that can be difficult or laborious to re-homogenise.

Avoiding a relatively large increase in the viscosity of the active ingredient dispersed phase is complex and difficult to achieve since any added rheological modifier must be added in an amount sufficient to support the total weight of the dispersed active ingredient. Consequently, oil-based suspension concentrates often have the disadvantage of having either a high viscosity or a significant amount of gravitational separation on storage, or in some cases both disadvantages can exist together.

An alternative approach is to balance the density by either increasing the density of the continuous phase such that the suspended particles are neutrally buoyant or by adding low density particles that can reduce the combined density of the dispersed phase. It is usually not possible under realistic conditions to increase the density of the continuous phase to the required level.

For the approach using low density particles JP-A-11228303 discloses that plastic hollow particles can be included in aqueous suspension concentrates for rice paddy application. However, it does not teach how hollow particles can be used to stabilise oil based suspension concentrates against gravitational separation. Furthermore, it does not teach how a lower viscosity can be achieved by the addition of hollow particles.

US-A 2003/0118626 teaches stable aqueous suspensions of agrochemical active compounds containing microspheres with a density between 0.3 and 1.3 $g/cm^3$ (preferably 0.4 to 1.05 $g/cm^3$). However, US-A 2003/0118626 relates to aqueous suspensions concentrates and not to oil-based suspension concentrates and further US-A 2003/0118626 does not teach that the viscosity can be reduced by the addition of microspheres. The addition of low density particles to aqueous suspension concentrates does not obviously teach how to formulate gravitationally stable oil-based dispersions that have a low viscosity since it is well understood that increasing the volume of particles in a suspension increases the viscosity substantially.

SUMMARY

The object of the present invention was to provide oil based suspension concentrates which show low gravitational separation without a substantial increase in viscosity (measured at a shear rate of 20 $s^{-1}$).

This object was solved by the use of low density particles with a density equal or less than 0.27 $g/cm^3$ that are importantly combined with a reduced amount of a rheological modifier such that the low density particles balance the density from the dispersed particulates and that the rheological modifier is sufficient to hold the low density particles within the suspension without increasing the viscosity to the level that would be required without low density particles.

DETAILED DESCRIPTION OF A PREFERRED EMBODIMENT

Figure 1:
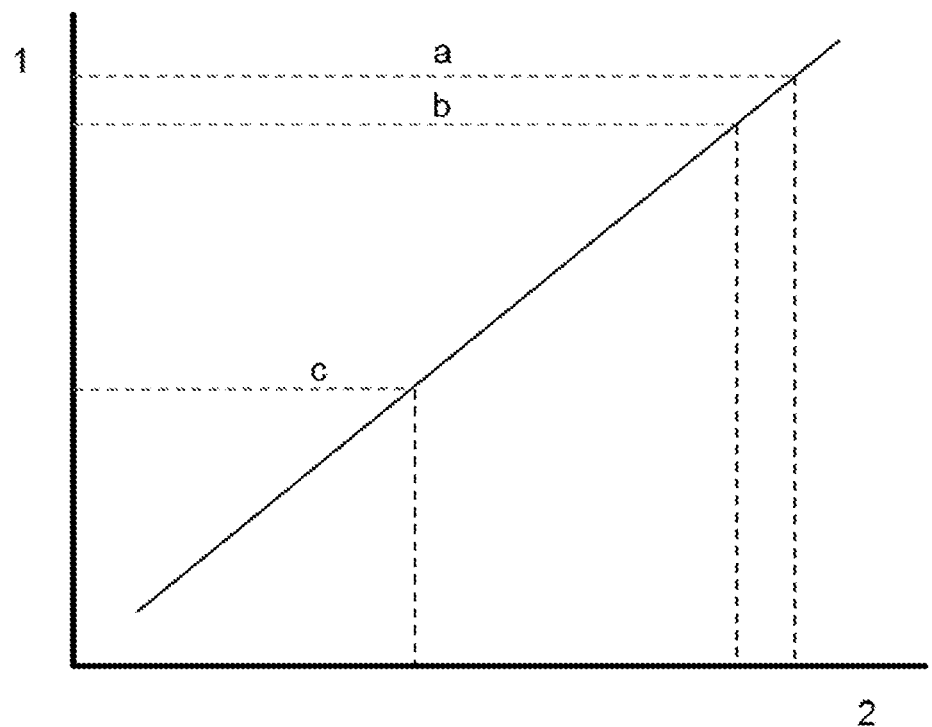
FIGS. 1-2 depict embodiments as described herein.

It is especially important in this regard that the particles have a density equal or less than 0.27 $g/cm^3$ to minimise the volume of low density particles required since the addition of low density particles increases the viscosity. The greatest viscosity reduction can be achieved with the low density particles having the lowest density.

Compositions according to the invention have the advantage that they do not form a dense sediment that can be highly viscous and hard to re-homogenise while they still have a low viscosity allowing the product to easily empty from the pack and to easily disperse in the spray tank.

The present invention is directed to an oil-based suspension concentrate, comprising at least one agrochemical active compound, which is solid at room temperature, and low-density particles having a density of 0.001 to 0.27 $g/cm^3$, preferably 0.001 to 0.2 $g/cm^3$, more preferably 0.01 to 0.16 $g/cm^3$ and especially preferred 0.05 to 0.15 $g/cm^3$. The density in context of the present invention is the density of the individual low density particles and not the bulk density.

The oil-based suspension concentrate according to the invention comprises 1 to 80 g/l of one or more rheological modifier.

The oil-based suspension concentrate according to the invention further comprises 0.01 to 50 g/l of low-density particles.

The oil-based suspension concentrate according to the invention comprises at least 300 g/l of one or more water immiscible fluids and is essentially free of water. Essentially free in context of the present invention shall mean less than 50 g/l of water.

It is preferred that the oil-based suspension concentrate according to the invention comprises
- a) 2 to 500 g/l of one or more agrochemical active compound which is solid at room temperature,
- b) 1 to 80 g/l of one or more rheological modifier,
- c) 0.01 to 50 g/l of low-density particles,
- d) 300 to 900 g/l of one or more water immiscible fluid and
- e) 5 to 250 g/l of one or more non-ionic surfactant or dispersing aid and/or at least one anionic surfactant or dispersing aid, wherein the low-density particles c) have a density of 0.001 to 0.27 $g/cm^3$, preferably 0.001 to 0.2 $g/cm^3$, more preferably 0.01 to 0.16 $g/cm^3$ and especially preferred 0.05 to 0.15 $g/cm^3$.

More preferred the oil-based suspension concentrate according to the invention comprises
- a) 20 to 280 g/l of one or more agrochemical active compound which is solid at room temperature,
- b) 2 to 60 g/l of one or more rheological modifier,
- c) 0.5 to 25 g/l of low-density particles,
- d) 300 to 900 g/l of one or more water immiscible fluid and
- e) 10 to 150 g/l of one or more non-ionic surfactant or dispersing aid and/or at least one anionic surfactant or dispersing aid, wherein the low-density particles c) have a density of 0.001 to 0.27 $g/cm^3$, preferably 0.001 to 0.2 $g/cm^3$, more preferably 0.01 to 0.16 $g/cm^3$ and especially preferred 0.05 to 0.15 $g/cm^3$.

Particularly preferred the oil-based suspension concentrate according to the invention comprises
- a) 100 to 200 g/l of one or more agrochemical active compound which is solid at room temperature,
- b) 4 to 50 g/l of one or more rheological modifier,
- c) 0.5 to 20 g/l of low-density particles,
- d) 300 to 800 g/l of one or more water immiscible fluid and
- e) 20 to 150 g/l of one or more non-ionic surfactant or dispersing aid and/or at least one anionic surfactant or dispersing aid, wherein the low-density particles c) have a density of 0.001 to 0.27 $g/cm^3$, preferably 0.001 to 0.2 $g/cm^3$, more preferably 0.01 to 0.16 $g/cm^3$ and especially preferred 0.05 to 0.15 $g/cm^3$.

Optionally the oil-based suspension concentrate according to the invention also comprises the following additional components:
- f) 1 to 400 g/l, preferably 10 to 200 g/l of one or more penetration promoters, wetting agents, spreading agents and/or retention agents,
- g) 0.02 to 400 g/l, preferably 1 to 100 g/l of one or more additives from the group consisting of emulsifying agents, solvents, antifoam agents, preservatives, antioxidants, colourants, activators for rheological modifiers and/or the inert filling materials,
- h) 1 to 800 g/l, preferably 10 to 400 g/l of one or more agrochemical active compound which is liquid or in solution in the liquid phase at room temperature.

In another particularly preferred embodiment oil-based suspension concentrates according to the invention comprise
- a) 10 to 250 g/l, preferably 100 to 200 g/l of one or more active ingredients selected from imidacloprid, thiacloprid, acetamiprid, spirotetramat, flubendiamide, tetraniliprole, diflufenican, thiencarbazone-methyl, tembotrione, tebuconazole, fluopicolide, prothioconazole or bixafen;
- b) 4 to 40 g/l of Bentone® 34, Bentone® 38, Bentone® SD3, Attagel® 50 or Pangel® B20; or
  5 to 50 g/l of Aerosil® 200, Aerosil® R972 or Aerosil® R974; or
  8 to 30 g/l of Thixin® R or Thixatrol® ST;
- c) 0.5 to 5 g of low density particles with a density ranging from 0.025 to 0.050 $g/cm^3$, e.g. Expancel® 091 DE40d30; or
  1 to 10 g of low density particles with a density ranging from 0.050 to 0.10 $g/cm^3$, e.g. Expancel® 461 DE40d60 or Expancel® 551 DE20d60; or
  2 to 20 g of low density particles with a density ranging from 0.10 to 0.18 $g/cm^3$, e.g. 3M® Glass Bubbles K1, 3M® Glass Bubbles K15, Dualite® E135-040D or Dualite® E130-055D; or
  4 to 20 g of low density particles with a density ranging from 0.18 to 0.27 $g/cm^3$, e.g. 3M® Glass Bubbles S22;
- d) 450 to 750 g/l of one or more water immiscible fluids selected from rapeseed oil methyl ester, sunflower oil, Exxsol® D100, Solvesso® 200, ethylhexyl oleate, ethylhexyl palmitate, ethylhexyl laurate/myristate, ethylhexyl laurate, ethylhexyl caprate or Isopropyl myristate, as single products or in mixtures;
- e) 10 to 125 g of one or more non-ionic or anionic dispersants selected from dodecyl benzene sulfonate Ca salt (e.g. Rhodacal® 60BE), naphthalene sulfonate-formaldehyde condensate Na salt (e.g. Morwet® D-425), tristyrylphenol ethoxylate sulphate salt (e.g. Soprophor® 4D384), tristyrylphenol ethoxylate phosphate (e.g. Soprophor® 3D33, Dispersogen® LFH), tristyrylphenol ethoxylate phosphate salt (e.g. Soprphor® FLK) or branched C12/15 alcohol ethoxylates (e.g. Synperonic® A3, Synperonic® A7);
- f) optionally 25 to 125 g of one or more penetration promoters, wetting agents, spreading agents and/or retention agents selected from branched alcohol ethoxylate-propoxylates (e.g. Lucramul® HOT 5902), iso-C13 alcohol ethoxylates (e.g. Genapol® X060), Me-capped iso-C13 alcohol ethoxylates (e.g. Genapol® XM 060) or dioctylsulfosuccinate sodium salt (e.g. Triton® GR 7 ME);
- g) optionally 0.5 to 100 g/l of one or more additives from the group consisting of emulsifying agents, solvents, antifoam agents, preservatives, antioxidants, pH-adjuster, colourants, activators of rheological modifiers and/or inert filling materials selected from BHT, citric acid, sodium carbonate, formic acid, attapulgite clay (e.g. Attagel® 50), precipitated silica (e.g. Sipernat® 22S), propylene carbonate, cyclohexanone, ethoxylated castor oil (e.g. Berol® 192, 827, 828, 829, Emulsogen EL-400), sorbitan oleates (e.g. Tween® 20, 80, 85) or silicone oil defoamer (e.g. Silcolapse® 482);
- h) 10 to 100 g/l of deltamethrin.

Subject of the present invention is also a process for preparation of the oil-based suspension concentrate, characterized in that in a first step (1) the solid phase comprising the solid agrochemical active compound or compounds a) and the continuous fluid phase comprising the immiscible fluid or fluids d) are mixed, followed by a second step (2) where the resulting suspension is ground and the remaining components b), e), f), g) and h) are added and in third step (3) where component c) is added.

In another embodiment of the process according to the invention in a first step (1) the solid phase comprising the solid agrochemical active compound or compounds a) and the continuous fluid phase comprising the immiscible fluid or fluids d) and the other components listed in groups b), e), f), g) and h) are mixed, followed by a second step (2) where the resulting suspension is ground and in third step (3) where component c) is added.

It is preferred to prepare a pre-gel of components b) and d) which is added to the resulting suspension after step (2).

In the third step (3) of the process according to the invention the low density particles c) are added in an amount that balances the weight of the solid phase from the solid agrochemical active compound(s) a). This is achieved when the density of the non-aqueous dispersion with the added low-density particles has a density equal to continuous fluid phase.

The solid agrochemical active ingredient particles of the process according to the invention have an average particle size of below 20 μm, preferred between 0.5 and 10 μm.

The temperatures can be varied within a certain range when carrying out the process according to the invention. The process is in general carried out at temperatures between 10° C. and 50° C., preferably between 15° C. and 35° C.

For carrying out the process according to the invention, customary mixing and grinding equipment is suitable which is employed for the preparation of agrochemical formulations.

The low density particles can be added preferentially after grinding. The rheological additives can be prepared as a pre-gel that can be mixed with the other constituents or they can be incorporated directly with the other constituents according to the requirements of the recipe.

Following this process will result in non-aqueous suspension concentrates that are representative of this invention. Examples of this are illustrated in the examples below.

The oil-based suspension concentrates according to the invention are formulations which remain stable even after relatively long storage at elevated temperatures or in the cold. They can be converted into homogeneous spray liquids by dilution with water. These spray liquids are used according to customary methods, for example, by spraying, watering or injecting.

The invention is based on the effect that by addition of low density particles in an amount between 0.01 to 50 g/l the suspended mass of the dispersed active compound particles a) can be balanced and by addition of a rheological modifier b) in an amount between 1 to 80 g/l the active compound particles a) and low density particles c) can be locally locked into a weak, reversible network. The amount of rheological modifier b) according to the invention is below the level required to prevent gravitational separation outside of this invention and this network can be measured rheologically by its static yield stress and elastic modulus and surprisingly yields highly stable oil-based suspension concentrates with surprisingly low viscosities. Furthermore, the reduction in viscosity is only achievable with low density particles c) having a density equal or less than about 0.27 g/cm³.

The amount of rheological modifier b) is chosen to give a weak elastic gel that is not sufficient to prevent gravitational separation in a suspension without low density particles but that is sufficient to prevent gravitational separation of the low density particles from the weak elastic gel. Both of these are stress controlled processes, importantly in the first case the stress is substantially larger than in the second case. It is this difference that is exploited in this invention by reducing the limiting stress from that required in the whole suspension to that required to hold the low density particles locally in the weak elastic gel (see FIG. 1). Higher amounts that are commonly used are unnecessary in the presence of the low-density particles since they increase the viscosity without additional improvements to the gravitation stability. FIG. 1 illustrates the static yield stress (1) against the concentration of rheological modifier (2) and that a much weaker network structure is required in the case of low-density particles to prevent gravitational separation wherein (a) is the point at which the formulation becomes too viscous for easy pouring from it's pack and for good dispersion on dilution in the spray liquid, (b) is the point at which low gravitational separation is achieved in the formulation (e.g. 5%) and (c) denotes the network structure required to hold microspheres in the formulation without gravitational separation.

Figure 2:
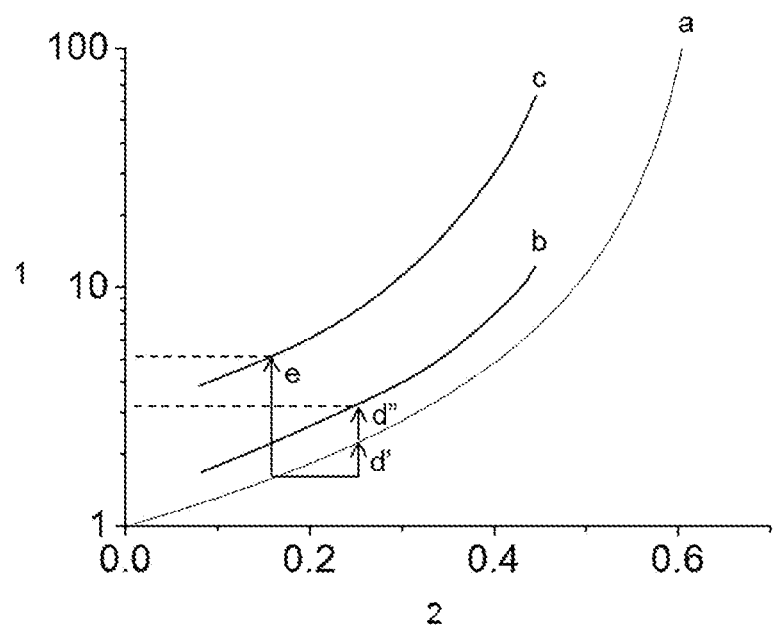

The resulting oil-based suspensions according to the invention have a remarkably good stability against gravitational separation, and at the same time they exhibit a low viscosity in relation to their content of dispersed particles and to the viscosity of the continuous phase. This is particularly surprising since the resulting oil-based suspensions according to the invention contain lower amounts of rheological modifiers than what would normally be required to achieve an oil based suspension outside the invention with comparable stability (see FIG. 2). FIG. 2 illustrates the viscosity increase from the low-density particles and low level of rheological modifier and that this is significantly less than that required for the case of the suspension plus rheological modifier. FIG. 2 demonstrates 1 Relative viscosity.
2 Volume fraction of dispersed particulate phase.
a Viscosity of suspension without rheological additive.
b Viscosity of suspension containing sufficient rheological modifier to hold the low-density particles without gravitational separation.
c Viscosity of suspension without low-density particles containing sufficient rheological modifier to achieve low levels of synersis (e.g. 5%).
d Increase in volume fraction and relative viscosity from addition of low-density particles d' and rheological modifier d". This shows how addition of low-density particles increases the volume fraction of the dispersed particulate phase to d' which results in a small increase in the relative viscosity. Then the addition of a small amount of rheological modifier sufficient to prevent gravitational separation of the low-density particles results in a further small increase in the relative viscosity to d".
e Increase in relative viscosity from addition of rheological modifier without low-density particles. This shows how addition of a rheological modifier at a concentration sufficient to achieve a low level of gravitational separation results in a significantly larger increase in the relative viscosity to e.

The relative viscosity is the viscosity of the suspension divided by the viscosity of the fluid phase, which for the illustration here the fluid phase is taken as the liquid phase without any rheological modifier, without any active ingredient particles and without any low-density particles.

The oil-based suspension concentrates according to the invention also show a number of additional advantages including easier emptying from the container, lower residues from the container after emptying and rinsing, improved spontaneity and dispersion in the spray tank, easier pumping, pouring and filling during manufacture and bottling.

Finally, it has been found that the oil-based suspension concentrates according to the invention are very highly suitable for the application of the agrochemical active compounds contained to plants and/or their habitat.

Suitable compounds a) of the oil-based suspension concentrates according to the invention are agrochemical active compounds which are solid at room temperature.

Solid, agrochemical active compounds a) are to be understood in the present com-position as meaning all substances customary for plant treatment, whose melting point is above 20° C. Fungicides, bactericides, insecticides, acaricides, nematicides, molluscicides, herbicides, plant growth regulators, plant nutrients and repellents may preferably be mentioned.

Preferred insecticides a) are
imidacloprid, nitenpyram, acetamiprid, thiacloprid, thiamethoxam, clothianidin;
cyantraniliprole, chlorantraniliprole, flubendiamide, tetraniliprole, cyclaniliprole;
spirodiclofen, spiromesifen, spirotetramat;
abamectin, acrinathrin, chlorfenapyr, emamectin, ethiprole, fipronil, flonicamid, flupyradifurone, indoxacarb, metaflumizone, methoxyfenozid, milbemycin, pyridaben, pyridalyl, silafluofen, spinosad, sulfoxaflor, triflumuron;
compound mentioned in WO 2006/089633 as example I-1-a-4, compound mentioned in WO 2008/067911 as example I-1-a-4, compound mentioned in WO 2013/092350 as example Ib-14, compound mentioned in WO 2010/51926 as example Ik-84.

More preferred insecticides a) are imidacloprid, acetamiprid, thiacloprid, thiamethoxam, cyantraniliprole, chlorantraniliprole, flubendiamide, tetraniliprole, cyclaniliprole, spiromesifen, spirotetramat, ethiprole, fipronil, flupyradifurone, methoxyfenozid, sulfoxaflor and triflumuron.

Preferred fungicides a) are for example such as bixafen, fenamidone, fenhexamid, fluopicolide, fluopyram, fluoxastrobin, iprovalicarb, isotianil, pencycuron, penflufen, propineb, prothioconazole, tebuconazole, trifloxystrobin, ametoctradin, amisulbrom, azoxystrobin, benthiavalicarb-isopropyl, benzovindiflupyr, boscalid, carbendazim, chlorothanonil, cyazofamid, cyflufenamid, cymoxanil, cyproconazole, difenoconazole, ethaboxam, epoxiconazole, famoxadone, fluazinam, fluquinconazole, flusilazole, flutianil, fluxapyroxad, isopyrazam, kresoxim-methyl, lyserphenvalpyr, mancozeb, mandipropamid, oxathiapiprolin, penthiopyrad, picoxystrobin, probenazole, proquinazid, pydiflumetofen, pyraclostrobin, sedaxane, tebufloquin, tetraconazole, valiphenalate, zoxamide, N-cyclopropyl-3-(difluoromethyl)-5-fluoro-N-(2-isopropylbenzyl)-1-methyl-1H-pyrazole-4-carboxamide, 2-{3-[2-(1-{[3,5-bis(difluoromethyl)-1H-pyrazol-1-yl]acetyl}-piperidin-4-yl)-1,3-thiazol-4-yl]-4,5-dihydro-1,2-oxazol-5-yl}-3-chlorophenyl methanesulfonate.

More preferred fungicides a) are for example such as bixafen, fenamidone, fluopicolide, fluopyram, fluoxastrobin, isotianil, penflufen, propineb, prothioconazole, tebuconazole, trifloxystrobin, ametoctradin, amisulbrom, azoxystrobin, benthiavalicarb-isopropyl, benzovindiflupyr, boscalid, chlorothanonil, cyazofamid, cyflufenamid, cymoxanil, cyproconazole, difenoconazole, ethaboxam, epoxiconazole, fluazinam, fluquinconazole, fluxapyroxad, isopyrazam, lyserphenvalpyr, mancozeb, oxathiapiprolin, penthiopyrad, picoxystrobin, probenazole, proquinazid, pydiflumetofen, pyraclostrobin, tetraconazole, valiphenalate, zoxamide, N-cyclopropyl-3-(difluoromethyl)-5-fluoro-N-(2-isopropylbenzyl)-1-methyl-1H-pyrazole-4-carboxamide, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate.

Preferred herbicides a) are for example (always comprise all applicable forms such as acids, salts, ester, with at least one applicable form): aclonifen, amidosulfuron, bensulfuron-methyl, bromoxynil, bromoxynil potassium, chlorsulfuron, clodinafop, clodinafop-propargyl, clopyralid, 2,4-D, 2,4-D-dimethylammonium, -diolamin, -isopropylammonium, -potassium, -triisopropanolammonium, and -trolamine, 2,4-DB, 2,4-DB dimethylammonium, -potassium, and -sodium, desmedipham, dicamba, diflufenican, diuron, ethofumesate, ethoxysulfuron, fenoxaprop-P, fenquinotrione, flazasulfuron, florasulam, flufenacet, fluroxypyr, flurtamone, fomesafen, fomesafen-sodium, foramsulfuron, glufosinate, glufosinate-ammonium, glyphosate, glyphosate-isopropylammonium, -potassium, and trimesium, halauxifen, halauxifen-methyl, halosulfuron-methyl, indaziflam, iodosulfuron-methyl-sodium, isoproturon, isoxaflutole, lenacil, MCPA, MCPA-isopropylammonium, -potassium, and sodium, MCPB, MCPB-sodium, mesosulfuron-methyl, mesotrione, metosulam, metribuzin, metsulfuron-methyl, nicosulfuron, pendimethalin, penoxsulam, phenmedipham, pinoxaden, propoxycarbazone-sodium, pyrasulfotole, pyroxasulfone, pyroxsulam, rimsulfuron, saflufenacil, sulcotrion, tefuryltrione, tembotrione, thiencarbazone-methyl, topramezone, triafamone, tribenuron-methyl.

More preferred herbicides a) are for example (always comprise all applicable forms such as acids, salts, ester, with at least one applicable form): amidosulfuron, bensulfuron-methyl, chlorsulfuron, diflufenican, ethoxysulfuron, fenquinotrione, flaza-sulfuron, flufenacet, fluroxypyr, foramsulfuron, halauxifen, halauxifen-methyl, halosulfuron-methyl, iodosulfuron-methyl-sodium, mesosulfuron-methyl, mesotrione, metsulfuron-methyl, nicosulfuron, penoxsulam, pinoxaden, propoxycarbazone-sodium, pyrasulfotole, pyroxasulfone, rimsulfuron, tembotrione, thien-carbazone-methyl, tribenuron-methyl.

Preferred safeners a) or h) are: Mefenpyr-diethyl, Cyprosulfamide, Isoxadifen-ethyl, (RS)-1-methylhexyl (5-chloroquinolin-8-yloxy)acetate (Cloquintocet-mexyl, CAS-No.: 99607-70-2).

Suitable compounds b) of the oil-based suspension concentrates according to the invention are rheological modifier selected from the group consisting of hydrophobic and hydrophilic fumed and precipitated silica particles, gelling clays including bentonite, hectorite, laponite, attapulgite, sepiolite, smectite, hydrophobically/organophilic modified bentonite, hectorite, hydrogentated castor oil (trihydroxystearin) or castor oil organic derivatives.

Preferred rheological modifiers b) are for example organically modified hectorite clays such as Bentone® 38 and SD3. organically modified bentonite clays, such as Bentone® 34, SD1 and SD2, organically modified sepeolite such as Pangel® B20, hydrophilic silica such as Aerosil® 200, hydrophobic silica such as Aerosil® R972, R974 and R812S, attapulgite such as Attagel® 50, or organic rheological modifiers based on modified castor oil such as Thixcin® R and Thixatrol® ST.

TABLE 1

Physical properties of the preferred compounds b)

| Tradename | Company | General description | Physical propeties | CAS-No. |
|---|---|---|---|---|
| Bentone ® 38 | Elementis Specialties, US | Organic derivative of a hectorite clay | Density: 1.7 g/cm$^3$ | 12001-31-9 |
| Bentone ® SD-3 | Elementis Specialties, US | Organic derivative of a hectorite clay | Density: 1.6 g/cm$^3$ Particle size (dispersed): <1 µm | |
| Bentone ® 34 | Elementis Specialties, US | Organic derivative of a bentonite clay | Density: 1.7 g/cm$^3$ | 68953-58-2 |
| Bentone ® SD-1 | Elementis Specialties, US | Organic derivative of a bentonite clay | Density: 1.47 g/cm$^3$ | 89749-77-9 |
| Bentone ® SD-2 | Elementis Specialties, US | Organic derivative of a bentonite clay | Density: 1.62 g/cm$^3$ | 89749-78-0 |
| Pangel ® B20 | Tolsa S.A., ES | Organically modified sepiolite | | 63800-37-3 |
| Sipernat ® 22S | Evonik Industries AG, DE | Precipitated amorphous silicon dioxide | *BET: 190 m$^2$/g Average primary particle size: 12 nm | 112926-00-8 |
| Aerosil ® 200 | Evonik Industries AG, DE | Hydrophilic fumed silica | *BET: 200 m$^2$/g Average primary particle size: 12 nm | 112945-52-5 7631-86-9 |
| Aerosil ® R 972/ R972V | Evonik Industries AG, DE | Hydrophilic fumed silica | *BET: 90-130 m$^2$/g | 68611-44-9 |
| Aerosil ® R 974 | Evonik Industries AG, DE | Hydrophilic fumed silica | *BET: 150-190 m$^2$/g | 68611-44-9 |
| Aerosil ® R 812S | Evonik Industries AG, DE | Hydrophilic fumed silica | *BET: 260 ± 30 m$^2$/g | 68909-20-6 |
| Attagel ® 50 | BASF AG, DE | Attapulgite clay: (Mg,Al)$_5$Si$_8$O$_{20}$•4H$_2$O | Density: >1.0 g/cm$^3$ Average particle size: 9 µm | 14808-60-7 |
| Thixcin ® R | Elementis Specialties, US | organic derivative of castor oil | Density: 1.02 g/cm$^3$ | 38264-86-7 |
| Thixatrol ® ST | Elementis Specialties, US | organic derivative of castor oil, Octadecanamide | Density: 1.02 g/cm$^3$ | 51796-19-1 |

*BET: Specific surface area

Preferred low-density particles c) are hollow microspheres composed of glass, ceramic or (co-)polymeric materials (e.g. acrylic, acrylonitrile or polyvinylidene chloride based) such as Expancel® 461 DE 40d60, Expancel® 461 DE 20d70, Expancel® 551 DE 40d42, Expancel® 461 DET 40 d25, Expancel® 551 DE 10d60, Expancel® 551 DE 20d60, Expancel® 091 DE 40d30, Expancel® 920 DET 40d25 (Akzo Nobel), 3M® K1, 3M® K15, 3M® S15, 3M® S22 (3M), acrylonitrile copolymer microspheres FN-80SDE, F-65DE, F-80DE (Matsumoto Yushi Seiyaku Co., Ltd), Dualite® E135-040D and E130-055D (Henkel) by way of example.

The preferred particle size (d50) ranges from 10 to 150 microns, preferably 20 to 90 microns, most preferably 30 to 65 microns to avoid phase separation and blocking of spray nozzles.

TABLE 2

Physical properties of the preferred compounds c)

| Tradename | Company | General description | Physical properties |
|---|---|---|---|
| Expancel ® 461 DE 40d60 | Akzo Nobel N.V., NL | Acrylic copolymer encapsulating a blowing agent | Density: 0.060 ± 0.005 g/cm$^3$. Particle size: 20-40 µm (d50) |
| Expancel ® 461 DE 20d70 | Akzo Nobel N.V., NL | Acrylic copolymer encapsulating a blowing agent | Density: 0.07 ± 0.006 g/cm$^3$. Particle size: 15-25 µm (d50) |
| Expancel ® 551 DE 40d42 | Akzo Nobel N.V., NL | Acrylic copolymer encapsulating a blowing agent | Density: 0.042 ± 0.004 g/cm$^3$ Particle size: 30-50 µm (d50) |
| Expancel ® 461 DET 40 d25 | Akzo Nobel N.V., NL | Acrylic copolymer encapsulating a blowing agent | Density: 0.025 ± 0.003 g/cm$^3.$ Particle size: 35-55 µm (d50) |
| Expancel ® 551 DE 10d60 | Akzo Nobel N.V., NL | Acrylic copolymer encapsulating a blowing agent | Density: 0.06 ± 0.005 g/cm$^3$ Particle size: 60 µm (d50) |

TABLE 2-continued

Physical properties of the preferred compounds c)

| Tradename | Company | General description | Physical properties |
|---|---|---|---|
| Expancel ® 551 DE 20d60 | Akzo Nobel N.V., NL | Acrylic copolymer encapsulating a blowing agent | Density: 0.06 g/cm$^3$ Particle size: 15-25 μm (d50) |
| Expancel ® 091 DE 40d30 | Akzo Nobel N.V., NL | Acrylic copolymer encapsulating a blowing agent | Density: 0.03 ± 0.003 g/cm$^3$ Particle size: 30-50 μm (d50) |
| Expancel ® 920 DET 40d25 | Akzo Nobel N.V., NL | Acrylic copolymer encapsulating a blowing agent | Density: 0.025 ± 0.003 g/cm$^3$ Particle size: 35-55 μm (d50) |
| 3M ® Glass Bubbles K1 | 3M N.V., BE | hollow glass spheres | Density: 0.125 g/cm$^3$ Particle size: 65 μm (d50) |
| 3M ® Glass Bubbles K15 | 3M N.V., BE | hollow glass spheres | Density: 0.15 g/cm$^3$ Particle size: 60 μm (d50) |
| 3M ® Glass Bubbles S15 | 3M N.V., BE | hollow glass spheres | Density: 0.15 g/cm$^3$ Particle size: 55 μm (d50) |
| 3M ® Glass Bubbles S22 | 3M N.V., BE | hollow glass spheres | Density: 0.22 g/cm$^3$ Particle size: 35 μm (d50) |
| Dualite ® E135-040D | Henkel KGaA, DE | ultra-low density polymeric product Shell - acrylonitrile copolymer Coating - calcium carbonate | Density: 0.135 ± 0.015 g/cm$^3$ Particle size: 30-50 μm (d50) |
| Dualite ® E130-055D | Henkel KGaA, DE | ultra-low density polymeric product Shell - polyvinylidene chloride copolymer Coating - calcium carbonate | Density: 0.13 ± 0.015 g/cm$^3$ Particle size: 45-65 μm (d50) |
| Matsumoto Microsphere ® FN-80SDE | Matsumoto Yushi-Seiyaku Co., Ltd, JP | microcapsules of thermoplastic resin Shell polymer: VCl2 - AN copolymer | Specific gravity: 0.025 ± 0.005 Average particle size 20-40 μm |
| Matsumoto Microsphere ® F-65DE | Matsumoto Yushi-Seiyaku Co., Ltd, JP | microcapsules of thermoplastic resin Shell polymer: VCl2 - AN copolymer | Specific gravity: 0.030 ± 0.005 Average particle size 40-60 μm |
| Matsumoto Microsphere ® F-80DE | Matsumoto Yushi-Seiyaku Co., Ltd, JP | microcapsules of thermoplastic resin Shell polymer: AN copolymer | Specific gravity: 0.020 ± 0.005 Average particle size 90-130 μm |

Preferred water-immiscible fluids d) are vegetable or mineral oils or esters of vegetable or mineral oils.

Suitable vegetable oils are all oils which can customarily be employed in agrochemical agents and can be obtained from plants. By way of example, sunflower oil, rapeseed oil, olive oil, castor oil, colza oil, corn oil, cottonseed oil and soya bean oil may be mentioned. Possible esters are ethylhexyl palmitate, ethylhexyl oleate, ethylhexyl myristate, ethylhexyl caprylate, iso-propyl myristate, iso-propyl palmitate, methyl oleate, methyl palmitate, ethyl oleate, by way of example. Rape seed oil methyl ester and ethylhexyl palmitate are preferred. Possible mineral oils are Exxsol® D100 and white oils.

TABLE 3

Exemplified trade names and CAS-No's of preferred compounds d)

| Tradename | Company | General description | CAS-No. |
|---|---|---|---|
| Sunflower oil | | Triglycerides from different C14-C18 fatty acids, predominantly unsaturated | 8001-21-6 |
| Rapeseed oil | | Triglycerides from different C14-C18 fatty acids, predominantly unsaturated | 8002-13-9 |

TABLE 3-continued

Exemplified trade names and CAS-No's of preferred compounds d)

| Tradename | Company | General description | CAS-No. |
|---|---|---|---|
| Corn oil | | Triglycerides from different C14-C18 fatty acids, predominantly unsaturated | 8001-30-7 |
| Soybean oil | | Triglycerides from different C14-C18 fatty acids, predominantly unsaturated | 8001-22-7 |
| Rice bran oil | | Triglycerides from different C14-C18 fatty acids, predominantly unsaturated | 68553-81-1 |
| Radia ® 7129 | Oleon NV, BE | ethylhexyl palmitate | 29806-73-3 |
| Crodamol ® OP | Croda, UK | | |
| Radia ® 7331 | Oleon NV, BE | ethylhexyl oleate | 26399-02-0 |
| Radia ® 7128 | Oleon NV, BE | ethylhexyl myristate/laurate C12/C14 | 29806-75-5 |
| Radia ® 7127 | Oleon NV, BE | ethylhexyl laurate | 20292-08-4 |
| Radia ® 7126 | Oleon NV, BE | ethylhexyl caprylate/caprate C8/10 | 63321-70-0 |
| Estol ® 1514 | Croda | iso-propyl myristate | 110-27-0 |
| Radia ® 7104 | Oleon NV, BE | Caprylic, capric triglycerides, neutral vegetable oil | 73398-61-5. 65381-09-1 |
| Radia ® 7732 | Oleon NV, BE | iso-propyl palmitate | 142-91-6 |
| Crodamol ® IPM | Croda, UK | | |
| Radia ® 7060 | Oleon NV, BE | methyl oleate | 112-62-9 |
| Radia ® 7120 | Oleon NV, BE | methyl palmitate | 112-39-0 |
| Crodamol ® EO | Croda | ethyl oleate | 111-62-6 |
| AGNIQUE ME ® 18 RD-F, Edenor ® MESU | Clariant, BASF | Rape seed oil methyl ester | 67762-38-3. 85586-25-0 |
| Exxsol ® D100 | Exxon Mobil | Hydrotreated light distillates (petroleum) | 64742-47-8 |
| Solvesso ® 200ND | ExxonMobil | Solvent naphtha (petroleum), heavy aromatic, naphtalene depleted | 64742-94-5 |
| Kristol ® M14 | Carless | White mineral oil (petroleum), C14-C30 | 8042-47-5 |
| Marcol ® 82 | ExxonMobil | | |
| Ondina ® 917 | Shell | branched and linear | |
| Exxsol ®D130 Banole ® 50 | ExxonMobil Total | White mineral oil (petroleum) | 64742-46-7 |
| Genera ®-12 | Total | White mineral oil (petroleum) | 72623-86-0 |
| Genera ®-9 | Total | White mineral oil (petroleum) | 97862-82-3 |

The oil-based suspension concentrates according to the invention contain at least one non-ionic surfactant or dispersing aid and/or at least one anionic surfactant or dispersing aid e).

Suitable non-ionic surfactants or dispersing aids e) are all substances of this type which can customarily be employed in agrochemical agents. Preferably polyethylene oxide-polypropylene oxide block copolymers, polyethylene glycol ethers of branched or linear alcohols, reaction products of fatty acids or fatty acid alcohols with ethylene oxide and/or propylene oxide, furthermore polyvinyl alcohol, polyoxyalkylenamine derivatives, polyvinylpyrrolidone, copolymers of polyvinyl alcohol and polyvinylpyrrolidone, and copolymers of (meth)acrylic acid and (meth)acrylic acid esters, furthermore branched or linear alkyl ethoxylates and alkylaryl ethoxylates, where polyethylene oxide-sorbitan fatty acid esters may be mentioned by way of example. Out of the examples mentioned above selected classes can be optionally phosphated and neutralized with bases.

Possible anionic surfactants are all substances of this type which can customarily be employed in agrochemical agents. Alkali metal, alkaline earth metal and ammonium salts of alkylsulphonic or alkylphosphoric acids as well as alkylarylsulphonic or alkylarylphosphoric acids are preferred. A further preferred group of anionic surfactants or dispersing aids are alkali metal, alkaline earth metal and ammonium salts of polystyrenesulphonic acids, salts of polyvinylsulphonic acids, salts of alkylnaphthalene sulphonic acids, salts of naphthalenesulphonic acid-formaldehyde condensation products, salts of condensation products of naphthalenesulphonic acid, phenolsulphonic acid and formaldehyde, and salts of lignosulphonic acid, all of which are not very soluble in vegetable oil.

TABLE 4

Exemplified trade names and CAS-No's of preferred compounds e)

| Tradename | Company | General description | CAS-No. |
|---|---|---|---|
| Morwet ® D-425 | Akzo Nobel | Naphthalene sulphonate formaldehyde condensate Na salt | 9008-63-3 |
| Triton ® GR 7 ME | Dow | dioctylsulfosuccinate sodium salt | 577-11-7 |
| Rhodacal ® 60/BE | Solvay | CaDBS (60%) in ethylhexanol | 26264-06-2 |
| Tanemul ® 1372RM | Levaco | CaDBS (30-50%) in RME | 26264-06-2 |
| Soprophor ® 4D384 | Solvay | tristyrylphenol ethoxylate (16EO) sulfate ammonium salt | 119432-41-6 |
| Soprophor ® 3D33 | Solvay | tristyrylphenol ethoxylate (16EO) phosphate | 90093-37-1 |
| Soprophor ® FLK | Solvay | Poly(oxy-1.2-ethanediyl), alpha.-2.4.6-tris(1-phenylethyl)phenyl-.omega.-hydroxy-, phosphate, potassium salt | 163436-84-8 |
| Supragil ® WP | Solvay | Sodium diisopropylnaphthalenesulphonate | 1322-93-6 |
| Reax ® 88A | Borregaard LignoTech | Lignosulfonic acid, sodium salt | 68512-34-5 |
| Borresperse ® NA | Borregaard LignoTech | Lignosulfonic acid, sodium salt | 8061-51-6 |

TABLE 4-continued

Exemplified trade names and CAS-No's of preferred compounds e)

| Tradename | Company | General description | CAS-No. |
|---|---|---|---|
| Synperonic ® A3 | Croda | alcohol ethoxylate (C12/C15-EO3) | 68131-39-5 |
| Synperonic ® A7 | Croda | alcohol ethoxylate (C12/C15-EO7) | 68131-39-5 |
| Synperonic ® PE/F127 | Croda | block-copolymer of polyethylene oxide and polypropylene oxide | 9003-11-6 |
| Atlox ® 4914. | Croda | Non-ionic random copolymer | |
| Atlox ® 4912 | Croda | block-copolymer of polyethylene oxide and polyhydroxystearic acid | |
| Dispersogen ® LFH | Clariant | tristyrylphenol ethoxylate (20EO) phosphate | 114535-82-9 |

Further additives f) which can optionally be contained in the formulations according to the invention are penetration promoters, wetting agents, spreading agents and/or retention agents. Suitable are all substances which can customarily be employed in agrochemical agents for this purpose.

Suitable examples for additives f) are ethoxylated branched alcohols (e.g. Genapol® X-type) with 2-20 EO units;

methyl end-capped, ethoxylated branched alcohols (e.g. Genapol® XM-type) comprising 2-20 EO units;

ethoxylated coconut alcohols (e.g. Genapol® C-types) comprising 2-20 EO units;

ethoxylated C12/15 alcohols (e.g. Synperonic® A-types) comprising 2-20 EO units;

propoxy-ethoxylated alcohols, branched or linear, e.g. Antarox® B/848, Atlas® G5000, Lucramul® HOT 5902;

propoxy-ethoxylated fatty acids, Me end-capped, e.g. Leofat® OC0503M;

organomodified polysiloxanes, e.g. BreakThru® OE444, BreakThru® S240, Silwett® L77, Silwett® 408;

mono- and diesters of sulfosuccinate Na salts with branched or linear alcohols comprising 1-10 carbon atoms;

ethoxylated diacetylene-diols (e.g. Surfynol® 4xx-range).

Suitable additives g) which can optionally be contained in the formulations according to the invention are emulsifiers (emulsifying agents; g1), solvents g2), antifoam agents g3), preservatives g4), antioxidants g5), colourants g6) and inert filling materials g7).

Possible emulsifiers g1) are all substances of this type which can customarily be employed in agrochemical agents. Suitable are ethoxylated nonylphenols, reaction products of alkylphenols with ethylene oxide and/or propylene oxide, alkylpolysaccharides, ethoxylated and/or propoxy-ethoxylated alcohols, ethoxylated castor oils, ethoxylated glycerine mono- or diesters, ethoxylated polyglycerine esters, ethoxylated arylalkylphenols, furthermore ethoxylated and propoxylated arylalkylphenols, and sulphated or phosphated arylalkyl ethoxylates or —ethoxy-propoxylates, where sorbitan derivatives, such as polyethylene oxide-sorbitan fatty acid esters and sorbitan fatty acid esters, may be mentioned by way of example.

Preferred emulsifiers g1) are tristyrylphenol ethoxylates comprising an average of 5-60 EO units;

castor oil ethoxylates comprising an average of 5-40 EO units (e.g. Berol® range, Emulsogen® EL range);

TABLE 5

Exemplified trade names and CAS-No's of preferred compounds f)

| Tradename | Company | General description | CAS-No. |
|---|---|---|---|
| Lucramul ® HOT 5902 | Levaco | alcohol ethoxylate-propoxylate (C8-PO8/EO6) | 64366-70-7 |
| Genapol ® X060 | Clariant | alcohol ethoxylate (iso-C13-EO6) | 9043-30-5 |
| Genapol ® XM 060 | Clariant | alcohol ethoxylate (iso-C13-EO6/Me capped) | 345642-79-7 |
| Triton ® GR 7 ME | Dow | dioctylsulfosuccinate sodium salt | 577-11-7 |
| BreakThru ® OE 444 | Evonik Industries | Siloxanes and Silicones, cetyl Me, di-Me | 191044-49-2 |
| BreakThru ® S240 | Evonik Industries | polyether modified trisiloxane | 134180-76-0 |
| Silwett ® L77 | Momentive | Polyalkyleneoxide modified heptamethyltrisiloxane | 67674-67-3 |
| Silwett ® 408 | Momentive | Polyalkyleneoxide modified heptamethyltrisiloxane | 67674-67-3 |
| Antarox ® B/848 | Solvay | Oxirane, methyl-, polymer with oxirane, monobutyl ether | 9038-95-3 |
| Atlas ® G5000 | Croda | Oxirane, methyl-, polymer with oxirane, monobutyl ether | 9038-95-3 |
| Leofat ® OC-0503M | Lion Chemical, JP | Oxirane, methyl-, polymer with oxirane, mono-(9Z)-9-octadecenoate, methyl ether, block | 181141-31-1 |
| Surfynol ® 440 | Air Products | 2.4.7.9-Tetramethyldec-5-yne-4.7-diol, ethoxylated | 9014-85-1 | fatty alcohol ethoxylates comprising branched or linear alcohols with 8-18 carbon atoms and an average of 2-30 EO units;

fatty acid ethoxylates comprising branched or linear alcohols with 8-18 carbon atoms and an average of 2-30 EO units;

ethoxylated mono- or diesters of glycerine comprising fatty acids with 8-18 carbon atoms and an average of 10-40 EO units (e.g. the Crovol range);

alkylpolysaccharides (e.g. Agnique® PG8107);

ethoxylated sorbitan fatty acid esters comprising fatty acids with 8-18 carbon atoms and an average of 10-50 EO units (e.g. Arlatone® T, Tween range).

TABLE 6

Exemplified trade names and CAS-No's of preferred emulsifiers g1)

| Tradename | Company | General description | CAS-No. |
|---|---|---|---|
| Berol® 827 | Akzo Nobel | castor oil ethoxylate (25EO) | 26264-06-2 |
| Berol® 828 | Akzo Nobel | castor oil ethoxylate (15EO) | 26264-06-2 |
| Berol® 829 | Akzo Nobel | castor oil ethoxylate (20EO) | 26264-06-2 |
| Berol® 192 | Akzo Nobel | castor oil ethoxylate (12EO) | 26264-06-2 |
| Alkamuls® A | Solvay | Oleic acid, ethoxylated | 9004-96-0 |
| Arlatone® T | Croda | ethoxylated sorbitol heptaoleate (40EO) | 54846-79-6 |
| Emulsogen® EL-400 | Clariant | castor oil ethoxylate (40EO) | 61791-12-6 |
| Crovol® CR70G | Croda | fats and glyceridic oils, vegetable, ethoxylated | 70377-91-2 |
| Agnique® PG8107 | BASF | Oligomeric D-glucopyranose decyl octyl glycosides | 68515-73-1 |
| Tween® 80 | Croda | Sorbitan monooleate, ethoxylated (20EO) | 9005-65-6 |
| Tween® 85 | Croda | Sorbitan trioleate, ethoxylated (20EO) | 9005-70-3 |
| Tween® 20 | Croda | Sorbitan monolaurate, ethoxylated (20EO) | 9005-64-5 |

Suitable solvents g2) are all substances which can customarily be employed in agrochemical agents for this purpose. Suitable examples for solvents are water, or esters, diesters, alcohols, diols, triols, amides, diamides, ester-amides, hydroxy-esters, alkoxy-esters, hydroxy-amides, alkoxy-amides, acetals or ketones comprising 1-12 carbon atoms in total including functional groups. Preferred examples which may be mentioned are N,N-dimethyldecanamide, glycerin, ethyl acetate, propylene glycol, methylethylketone, methylisobutylketone, cyclohexanone, propylene carbonate, glycerine carbonate, dimethyladipate, dimethylglutarate, 5-(N,N-dimethylamino)-5-oxo pentanoic acid methyl ester, methyl lactate, isobutyl lactate and N,N-dimethyllactamide.

Suitable antifoam substances g3) are all substances which can customarily be employed in agrochemical agents for this purpose. Silicone oils, silicone oil preparations are preferred. Examples are Silcolapse® 482 from Bluestar Silicones, Silfoam® SC1132 from Wacker [Dimethyl siloxanes and silicones, CAS No. 63148-62-9], SAG 1538 or SAG 1599 from Momentive [Dimethyl siloxanes and silicones, CAS No. 63148-62-9].

Possible preservatives g4) are all substances which can customarily be employed in agrochemical agents for this purpose. Suitable examples for preservatives are preparations containing 5-chloro-2-methyl-4-isothiazolin-3-one [CIT; CAS-No. 26172-55-4], 2-methyl-4-isothiazolin-3-one [MIT, Cas-No. 2682-20-4] or 1.2-benzisothiazol-3(2H)-one [BIT, Cas-No. 2634-33-5]. Examples which may be mentioned are Preventol® D7 (Lanxess), Kathon CG/ICP (Dow), Acticide SPX (Thor GmbH) and Proxel® GXL (Arch Chemicals).

Suitable antioxidants g5) are all substances which can customarily be employed in agrochemical agents for this purpose. Butylhydroxytoluene [3.5-Di-tert-butyl-4-hydroxytoluol, CAS-No. 128-37-0] is preferred.

Possible colourants g6) are all substances which can customarily be employed in agrochemical agents for this purpose. Titanium dioxide, carbon black, zinc oxide, blue pigments, red pigments and Permanent Red FGR may be mentioned by way of example.

Suitable inert filling materials g7) are all substances which can customarily be employed in agrochemical agents for this purpose, and which do not function as thickening agents. Inorganic particles, such as carbonates, silicates and oxides and also organic substances, such as urea-formaldehyde condensates, are preferred. Kaolin, rutile, silica ("highly disperse silicic acid"), silica gels, and natural and synthetic silicates, moreover talc, may be mentioned by way of example.

Suitable additives h) which can optionally be contained in the formulations according to the invention are one or more agrochemical active compound which are liquid or in solution at room temperature. Examples of suitable agrochemical active compounds h) include the following insecticides; pyrethroids (e.g. bifenthrin, cypermethrin, cyfluthrin, deltamethrin, betacyfluthrin, lambda-cyhalothrin, permethrin, tefluthrin, cypermethrin, transfluthrin, fenpropathrin, or natural pyrethrum). Preferred are betacyfluthrin or deltamethrin.

Examples of suitable fungicides are for example fenpropidin, fenpropimorph, spiroxamine, propiconazole, prothioconazole. Preferred are spiroxamine or prothioconazole.

Examples of suitable herbicides h) are for example (always comprise all applicable forms such as acids, salts, ester, with at least one applicable form): acetochlor, aclonifen, bromoxynil-butyrate, -heptanoate, and -octanoate, clethodim, clodinafop-propargyl, clomazone, 2,4-D-butotyl, -butyl and -2-ethylhexyl, 2,4-DB-butyl, -isooctyl, desmedipham, diclofop-P-methyl, ethofumesate, fenoxaprop-ethyl, fenoxaprop-P-ethyl, fluroxypyr-meptyl, MCPA-butotyl, -2-ethylhexyl, MCPB-methyl and -ethyl, S-metolachlor, phenmedipham, pinoxaden, tefuryltrione, tembotrione, thiencarbazone-methyl. Preferred are bromoxynil-butyrate, -heptanoate, and -octanoate, diclofop-P-methyl, fenoxaprop-ethyl, fenoxaprop-P-ethyl, pinoxaden or tembotrione.

Examples of suitable safeners h) are mefenpyr-diethyl, cyprosulfamide, isoxadifen-ethyl, cloquintocet-mexyl, preferred are mefenpyr-diethyl or isoxadifen-ethyl.

The invention is illustrated by the following examples.

EXAMPLES

In the preparation of the formulations in the following Examples the following components have been used:
General Description for Estimating the Required Quantity of Low-Density Particles
The quantity of low density particles is chosen to balance the weight of the suspended particulate phase in the continuous phase. This can be determined by experimentation whereby a range of concentrations of low density particles are added and the optimum concentration chosen from the concentration which gives zero or the least amount of separation up or down.

The method for measuring the densities are known in the art. The preferred method is with a PAAR Density meter.

The rheology was measured using Malvern Gemini/HR nano rheometers (Malvern Instruments) with Couette (C25), double gap (DG24/27) or cone and plate (CP4/40) measuring geometries at 20° C. Roughened measuring geometries were used to minimize wall slip effects. The sample was gently inverted several times until homogeneous before loading in the rheometer to ensure homogeneity. Vigorous agitation was not applied.

The viscosity was measured by applying a logarithmically distributed range of shear rates from $1.8 \times 10^{-1}$ to $1.2 \times 10^{3}$ s$^{-1}$ and then back to $1.8 \times 10^{-1}$ s$^{-1}$ over a total measurement time of about 350 s. The viscosity at a shear rate of 20 s$^{-1}$ was recorded both on the upward and downward curves.

The static yield stress was measured in controlled stress mode by applying a logarithmic stress ramp from 0.002 Pa to 20 Pa over a total measurement time of 120 s. The static yield stress was determined at the point where the stress-strain response plotted on a log-log graph deviated from linearity to the applied stress.

These tests can be performed on many commercially available rheometers that are able to operate in both controlled stress and controlled strain modes.

Preparation Methods:
Method 1

A portion of the water immiscible fluid d) was charged to a vessel and the solid active ingredient a) added to give a concentration of 20 to 40% w/w under high shear agitation from an Ultra-Turrax® rotor-stator mixer. This was then milled through an Eiger® 100 Mini motor mill (available from Eiger Torrance) containing 75 to 80% of 1.2 mm glass beads by recirculation for 20-40 minutes at 2000 to 3000 rpm until a particle size of about 1 to 4 μm was obtained. The temperature was maintained between 20 and 35° C. by cooling. A separate pre-gel of the rheological modifier b) was prepared in a portion of the water immiscible fluid d) and optionally activator(s) g) by high shear mixing with an Ultra-Turrax® as described in the examples. To the milled suspension the remaining components d), e), f), g) and h) were charged and mixed until homogeneous with an Ultra-Turrax®. The low-density particles c) were then added and incorporated carefully by an Ultra-Turrax® at low speed.

Method 2

A portion of the water immiscible fluid d) and other formulation auxiliaries e) to h) were charged to a vessel and the solid active ingredient a) added to give a concentration of 10 to 25% w/w under high shear agitation from an Ultra-Turrax® rotor-stator mixer. This was then milled through an Eiger® 100 Mini motor mill (available from Eiger Torrance) containing 75 to 80% of 1.2 mm glass beads by recirculation for 20-40 minutes at 2000 to 3000 rpm until a particle size of below 6 μm was obtained. The temperature was maintained between 20 and 35° C. by cooling. A separate pre-gel of the rheological modifier b) was prepared in a portion of the respective water immiscible fluid(s) d) and optionally activator(s) g) by high shear mixing with a Silverson® L4RT as described in the examples. To the milled suspension the pre-gel of the rheological modifier b) and the low-density particles c) were charged and adjusted with suitable amounts of the water immiscible fluid(s) d). Afterwards the suspension was carefully mixed until homogeneous with an Ultra-Turrax® at low speed.

Method 3

A portion of the water immiscible fluid d) was introduced into a vessel and the rheological modifier b) was added (concentration 2-8%). After mixing with an Ultra-Turrax®, propylene carbonate was added and the mixture brought to the gelled state using an Ultra-Turrax® at high shear. Subsequently the rest of the water immiscible fluid d) and liquid formulation auxiliaries e) to h) were added and again incorporated using the Ultra-Turrax®. Then all solid formulation auxiliaries g) and the active ingredient a) were subsequently added portion wise to give a concentration of 5 to 25% while mixing with an Ultra-Turrax® until completely incorporated. This was then milled through a Dynomill® with a rotation speed of ca. 3000 rpm, 70-85% 1.2 mm glass beads and an outlet temperature of 25-30° C. The low-density particles were added after milling and incorporated carefully with an Ultra-Turrax® at low speed.

The method of incorporating rheological modifiers into oil-based suspension formulations is known in the art.

All Examples which are "according to the invention" are expressly marked accordingly.

Example 1

Formulations were prepared with the following recipes:

| Component (g/l) | 1A | 1B | 1C | 1D* | 1E* | 1F |
| --- | --- | --- | --- | --- | --- | --- |
| a) Fluopicolide | 200 | 200 | 200 | 200 | 200 | 200 |
| b) Bentone ® 38 | 12.5 | 15 | 20 | 4 | 6 | 0 |
| g) Propylene carbonate/water 95:5 | 4.13 | 4.95 | 6.60 | 1.32 | 1.98 | 0 |
| c) Expancel ® 461 DE 40d60 | 0 | 0 | 0 | 7 | 7 | 7 |
| g) Berol ® 828 | 60 | 60 | 60 | 60 | 60 | 60 |
| e) Soprophor ® 4D384 | 30 | 30 | 30 | 30 | 30 | 30 |
| d) Ethylhexyl palmitate | 117 | 140 | 187 | 37 | 56 | 37 |
| d) Rapeseed oil methyl ester | ~566 | ~540 | ~489 | ~551 | ~531 | ~592 |

§5% pre-gel in ethylhexyl palmitate/rapeseed oil methyl ester 50:50 activated with propylene carbonate/water 95:5 (33% of Bentone content).
*Example according to the invention The method of preparation used was according to Method 1 described previously. The rheological modifier gelled concentrate was prepared as a Bentone® 38 5% pre-gel in ethylhexyl palmitate/rapeseed oil methyl ester 50:50 activated with propylene carbonate/water 95:5 (33% of Bentone® content). High shear mixing was applied for 20 minutes and a temperature of 40° C. was achieved.

|  | 1A | 1B | 1C | 1D* | 1E* | 1F |
|---|---|---|---|---|---|---|
| Rheology | | | | | | |
| Viscosity at 20s$^{-1}$ (up/down) (mPa s) | 476/435 | 677/507 | 1088/817 | 410/227 | 577/456 | 156/145 |
| Separation (%) | | | | | | |
| 4 weeks RT | 27% T | 15% T | 7% T | 3% T | 0% T | 9% T |
| 8 weeks RT | 30% T | 20% T | 10% T | 4% T | 0% T | 14% T |
| 6 months RT | 36% T | 26% T | 17% T | 4% T | 2% T | 19% T |
| 14 months RT | 40% T | 71% T | 20% T | 5% B | 2% T | 79% T |
| Sediment in container after 14 months RT | | | | | | |
| Sediment after x5 inversions | Large sed. vol. | Large sed. vol. | Large sed. vol. | No sed. | No sed. | No sed. |
| Sediment after x20 inversions | Hard sed. | Hard sed. | Slight sed. | No sed. | No sed. | No sed. |
| Sediment after x3 rinses | Hard sed. | Hard sed. | Slight sed. | No sed. | No sed. | No sed. |

*Example according to the invention;
T = top, B = bottom, T&B = top & bottom, M = middle Results:

The above samples demonstrate that the samples with low density particles and rheological modifier (1D, 1E) according to the invention showed the lowest gravitational separation and had a much lower viscosity than the samples containing only the rheological modifier at an inferior level of gravitational separation (1A, 1B, 1C). The sample containing low density particles without any rheological modifier was not stable, separation of the low density particles from the sedimenting active ingredient particles was observed. Furthermore, the samples containing only the rheological modifier (1A, 1B, 1C) gave hard sediments that did not fully re-suspend either after 20 inversions or additionally 3 rinses. The samples containing the low density particles and rheological modifier (1D, 1E) had no sediment after only 5 inversions.

It is most surprising here that even though a very wide range of concentrations of the rheological modifier have been used covering a very wide range of viscosities, including extremely high values (for comparison stable aqueous SCs typically cover 180 to 450 mPa s at 20 s$^{-1}$) it is not possible to achieve a formulation without significant gravitational separation without the inclusion of the low density particles and a low level of the rheological modifier. Furthermore it is surprising that formulations stable to gravitational separation can be achieved with significantly lower viscosities.

| | Dilution stability | | | | | |
|---|---|---|---|---|---|---|
| | 1A | 1B | 1C | 1D* | 1E* | 1F |
| Sediment (ml, 1 h) | 0.2 | 0.25 | 0.25 | 0.02 | 0.03 | 0.4 |

Additionally, the dilution stability results demonstrate that the examples according to the invention containing low density particles and rheological modifier (1D and 1E) have lower sediment volumes than the controls without low density particles (1A, 1B and 1C) and the control without any rheological modifier (1F).

Example 2

Formulations were prepared with the following recipes:

| Component (g/l) | 2A | 2B | 2C* | 2D |
|---|---|---|---|---|
| a) Prothioconazole | 150 | 150 | 150 | 150 |
| b) Bentone ® 38 | 15 | 20 | 8 | 0 |
| g) Propylene carbonate/water 95:5 | 4.95 | 6.60 | 2.64 | 0 |
| c) Expancel ® 461 DE 40d60 | 0 | 0 | 3 | 3 |
| g) Berol ® 828 | 30 | 30 | 30 | 30 |
| g) Alkamuls A | 30 | 30 | 30 | 30 |
| e) Soprophor ® 4D384 | 40 | 40 | 40 | 40 |
| d) Ethylhexyl palmitate | 140 | 187 | 74.7 | 0 |
| d) Rapeseed oil methyl ester (to 1 l) | ~534 | ~483 | ~562 | ~644 |

§ 5% pre-gel in ethylhexyl palmitate/rapeseed oil methyl ester 50:50 activated with propylene carbonate/water 95:5 (33% of Bentone content).
*Example according to the invention The method of preparation used was according to Method 1 described previously. The rheological modifier gelled concentrate was prepared as a Bentone® 38 5% pre-gel in ethylhexyl palmitate/rapeseed oil methyl ester 50:50 activated with propylene carbonate/water 95:5 (33% of Bentone content). High shear mixing was applied for 20 minutes, during which a temperature of 40° C. was achieved.

| | 2A | 2B | 2C* | 2D |
|---|---|---|---|---|
| Rheology | | | | |
| Viscosity at 20 s$^{-1}$ (up/down) (mPa s) | 693/573 | 2217/1690 | 188/154 | 48/33 |
| Separation (%) | | | | |
| 2 months RT | 5% T | 1% T | 1% B | 50% M |
| 9 months RT | 11% T | 4% T | 4% B | 75% B |

*Example according to the invention; T = top, B = bottom, T&B = top & bottom, M = middle Results:

The above samples demonstrate that the sample with low density particles and rheological modifier (2C) according to the invention showed equal or lower gravitational separation and had a much lower viscosity than the samples containing only the rheological modifier at a similar or inferior level of gravitational separation (2A, 2B). The sample containing low density particles without any rheological modifier (2D) was not stable, separation of the low density particles from the sedimenting active ingredient particles was observed.

Example 3

Formulations were prepared with the following recipes:

| Component (g/l) | 3A | 3B | 3C* | 3D* | 3E* | 3F |
|---|---|---|---|---|---|---|
| a) Prothioconazole | 150 | 150 | 150 | 150 | 150 | 150 |
| b) Aerosil® 200 | 45 | 50 | 30 | 35 | 40 | |
| c) Expancel® 461 DE 40d60 | | | 2.9 | 2.9 | 2.9 | 2.9 |
| g) Berol® 192 | 40 | 40 | 40 | 40 | 40 | 40 |
| e) Soprophor® 3D33 | 20 | 20 | 20 | 20 | 20 | 20 |
| f) Genapol® X060 | 30 | 30 | 30 | 30 | 30 | 30 |
| d) Rapeseed oil methyl ester (to 1 l) | ~678 | ~676 | ~642 | ~640 | ~638 | ~654 |

§10% pre-gel in rapeseed oil methyl ester;
*Example according to the invention

The method of preparation used was according to Method 1 described previously. The rheological modifier gelled concentrate was prepared as an Aerosil® 200 10% w/w pre-gel in rapeseed oil methyl ester. High shear mixing was applied to a 100 mL sample for 20 minutes, during which a temperature of 40° C. was achieved.

| | 3A | 3B | 3C* | 3D* | 3E* | 3F |
|---|---|---|---|---|---|---|
| Rheology | | | | | | |
| Viscosity at $20s^{-1}$ (up/down) (mPa s) | 347/334 | 524/488 | 229/219 | 290/272 | 319/311 | 54/49 |
| Separation (%) | | | | | | |
| 5 days RT | 2% T | 2% T | 0% T | 0% B | 0% T | 47% M |
| 1 month RT | 13% T | 11% T | 0% T | 4% B | 3.5% T | 64% M |
| 9 month RT | 44% T | 39% T | 11% B | 9% B | 6% T | 77% M |
| 1 month 40° C. | 15% T | 8% T | 1% B | 5% T | 3% T | 70% M |
| 9 months 40° C. | 24% T | 20% T/B | 8% B | 5% T | 4% T | 72% M |

*Example according to the invention;
T = top, B = bottom, T&B = top & bottom, M = middle Results:

The above samples demonstrate that the samples with low density particles and rheological modifier (3C, 3D, 3E) according to the invention showed the lowest gravitational separation and had a much lower viscosity than the samples containing only the rheological modifier at an inferior level of gravitational separation (3A, 3B). The sample containing low density particles without any rheological modifier (3F) was not stable, separation of the low density particles from the sedimenting active ingredient particles was observed within a very short period of 5 days.

Example 4

Formulations were prepared with the following recipes:

| Component (g/l) | 4A | 4B | 4C | 4D* | 4E* | 4F |
|---|---|---|---|---|---|---|
| a) Prothioconazole | 150 | 150 | 150 | 150 | 150 | 150 |
| b) Aerosil® R974 | 50 | 55 | 65 | 45 | 50 | 0 |
| c) Expancel® 461 DE 40d60 | 0 | 0 | 0 | 2.9 | 2.9 | 2.9 |
| g) Berol® 192 | 40 | 40 | 40 | 40 | 40 | 40 |
| e) Soprophor® 3D33 | 20 | 20 | 20 | 20 | 20 | 20 |
| g) Genapol® X060 | 30 | 30 | 30 | 30 | 30 | 30 |
| d) Rapeseed oil methyl ester (to 1 l) | ~676 | ~674 | ~670 | ~636 | ~634 | ~654 |

§as 10% pre-gel in rapeseed oil methyl ester
*Example according to the invention The method of preparation used was according to Method 1 described previously. The rheological modifier gelled concentrate was prepared as an Aerosil® R974 10% w/w pre-gel in rapeseed oil methyl ester. High shear mixing was applied to a 100 mL sample for 20 minutes, during which a temperature of 40° C. was achieved.

| | 4A | 4B | 4C | 4D* | 4E* | 4F |
|---|---|---|---|---|---|---|
| Rheology | | | | | | |
| Viscosity at $20s^{-1}$ (up/down) (mPa s) | 131/114 | 153/137 | 577/504 | 106/98 | 167/140 | 58/51 |
| Separation (%) | | | | | | |
| 2 months RT | 13% T | 6% T | 2% T | 2% B | 0% | 67% T |
| 9 months RT | 42% T | 34% T | 22% T | 9% B | 0% | 75% B |
| 9 months 40° C. | 81% M | 20% M | 22% M | 0% | 0% | 71% T&B |

*Example according to the invention;
T = top, B = bottom, T&B = top & bottom, M = middle Results:

The above samples demonstrate that the samples with low density particles and rheological modifier (4D, 4E) according to the invention showed the lowest gravitational separation and had a lower viscosity than the samples containing only the rheological modifier at an inferior or similar level of gravitational separation (4A, 4B, 4C). The sample containing low density particles without any rheological modifier (4F) was not stable, complete gravitational separation was observed.

Example 5

Formulations were prepared with the following recipes:

| Component (g/l) | 5A | 5B | 5C | 5D* | 5E* | 5F |
|---|---|---|---|---|---|---|
| a) Prothioconazole | 125 | 125 | 125 | 125 | 125 | 125 |
| b) Thixcin ® R | 14 | 18 | 26 | 8 | 12 | |
| c) Expancel ®461 DE 40d60 | | | | 2.5 | 2.5 | 2.5 |
| g) Berol ® 192 | 40 | 40 | 40 | 40 | 40 | 40 |
| e) Synperonic ® A3 | 40 | 40 | 40 | 40 | 40 | 40 |
| e) Rhodacal ® 60/BE | 20 | 20 | 20 | 20 | 10 | 10 |
| d) Rapeseed oil methyl ester | 94 | 94 | 94 | 94 | 94 | 94 |
| d) Ethylhexyl palmitate | 94 | 94 | 94 | 94 | 94 | 94 |
| d) Exxsol ® D100 (to 1 l) | ~478 | ~475 | ~468 | ~449 | ~453 | ~463 |

§ as 10% pre-gel in Exxsol D100
*Example according to the invention

The method of preparation used was according to Method 1 described previously. The rheological modifier gelled concentrate was prepared as a Thixcin R 10% w/w pre-gel in Exxsol® D100. A 150 mL sample was heated to a temperature of 68° C. and periodic medium shear mixing applied during cooling to 40° C.

| | 5A | 5B | 5C | 5D* | 5E* | 5F |
|---|---|---|---|---|---|---|
| Rheology | | | | | | |
| Viscosity at 20 s$^{-1}$ (up/down) (mPa s) | 158/136 | 190/165 | 228/200 | 154/144 | 157/141 | 69/68 |
| Separation (%) | | | | | | |
| 7 weeks RT | 30% T | 27% T | 22% T | 2% B | 0% | 15% M |
| 8 months RT | 40% T | 39% T | 34% T | 17% B | 4% B | 43% T + B + M |
| 8 months 40° C. | 25% T | 22% T | 15% T | 10% B | 1% B | 65% B |

*Example according to the invention; T = top, B = bottom, T&B = top & bottom, M = middle Results:

The above samples demonstrate that the samples with low density particles and rheological modifier according to the invention (5D, 5E) showed much lower gravitational separation and had a lower viscosity than the samples containing only the rheological modifier at an inferior level of gravitational separation (5A, 5B, 5C). The sample containing low density particles without any rheological modifier (5F) was not stable, separation of the low density particles from the sedimenting active ingredient particles was observed.

Example 6

Formulations were prepared with the following recipes:

| Component (g/l) | 6A | 6B | 6C | 6D | 6E | 6F* |
|---|---|---|---|---|---|---|
| a) Fluopicolide | 150 | 150 | 150 | 150 | 150 | 150 |
| b) Thixatrol ® ST | 25 | 35 | 40 | 45 | 10 | 27 |
| c) 3M K1 glass bubbles | | | | | 12 | 10 |
| e) Rhodacal ® 60/BE | 20 | 20 | 20 | 20 | 20 | 20 |
| g) Berol ® 192 | 40 | 40 | 40 | 40 | 40 | 40 |
| g) Synperonic ® A3 | 40 | 40 | 40 | 40 | 40 | 40 |
| d) Ethylhexyl palmitate | 112.5 | 112.5 | 112.5 | 112.5 | 112.5 | 112.5 |
| d) Rapeseed oil methyl ester (to 1 l) | ~575 | ~566 | ~562 | ~558 | ~504 | ~504 |

§ 10% pre-gel in rapeseed oil methyl ester.
*Example according to the invention

The method of preparation used was according to Method 1 described previously. The rheological modifier gelled concentrate was prepared as a Thixatrol ST 10% w/w pre-gel in rapeseed oil methyl ester. A 150 ml sample was heated to a temperature of 68° C. and periodic medium shear mixing applied during cooling to 40° C.

| | 6A | 6B | 6C | 6D | 6E | 6F* |
|---|---|---|---|---|---|---|
| Rheology | | | | | | |
| Viscosity at 20 s$^{-1}$ (up/down) (mPa s) | 92/98 | 226/267 | 635/1088 | 789/1002 | 60/45 | 393/537 |
| Separation (%) | | | | | | |
| 1 month RT | 27% T | 10% T | 2% T | 3% T | 28% T | 0% |
| 8 months RT | 27% T | 13% T | 3% T | 4% T | 33% T | 0% |
| 8 months 40° C. | 38% T | 14% T | 5% T | 2% T | 42% T | 0% |

*Example according to the invention; T = top, B = bottom, T&B = top & bottom

Results:

The combination of low density particles with an adequate level of rheological modifier according to the invention (6F) produces a recipe without gravitational separation with a lower viscosity than can be achieved with rheological modifier alone (6A to 6D). The combination of low density particles and insufficient levels of rheological modifier (6E) results in an unstable formulation showing strong gravitational separation can occur.

Example 7

Formulations were prepared with the following recipes:

| Component (g/l) | 7A | 7B | 7C* | 7D | 7E* | 7F* | 7G* | 7H* | 7I* |
|---|---|---|---|---|---|---|---|---|---|
| a) Bixafen | 120 | 120 | 120 | 120 | 120 | 120 | 120 | 120 | 120 |
| b) Bentone® SD3 | 14.5 | 20 | 9.5 | | 9.5 | 9.5 | 9.5 | 9.5 | 9.5 |
| c) Expancel® 461 DE 40d60 | | | 2 | 2 | 2 | 2 | 2 | 2 | 2 |
| g) Berol® 828 | 40 | 40 | 40 | 40 | 40 | 40 | 40 | 40 | 40 |
| e) Soprophor® 4D384 | 30 | 30 | 30 | 30 | 30 | 30 | 30 | 30 | 30 |
| f) Genapol® X 060 | 40 | 40 | 40 | 40 | 40 | 40 | 40 | 40 | 40 |
| d) Rapeseed oil methyl ester (to 1 L) | 308 | 268 | 308 | 308 | 308 | 308 | 308 | 308 | 308 |
| d) Ethylhexyl oleate (C18:1) (to 1 L) | ~398 | ~452 | ~334 | ~339 | | | | | |
| d) Ethylhexyl palmitate (C16) (to 1 L) | | | | | ~334 | | | | |
| d) Ethylhexyl laurate/myristate (C12/14) (to 1 L) | | | | | | ~334 | | | |
| d) Ethylhexyl laurate (C12) (to 1 L) | | | | | | | ~334 | | |
| d) Ethylhexyl caprate (C10) (to 1 L) | | | | | | | | ~334 | |
| d) Isopropyl myristate (C14) (to 1 l) | | | | | | | | | ~330 |

§ as 10% pre-gel in rapeseed oil methyl ester
*Example according to the invention The method of preparation used was according to Method 1 described previously. The rheological modifier gelled concentrate was prepared as a Bentone® SD3 5% pre-gel in rapeseed oil methyl ester. High shear mixing was applied for 20 minutes and a temperature of 40° C. was achieved.

| | 7A | 7B | 7C* | 7D | 7E* | 7F* | 7G* | 7H* | 7I* |
|---|---|---|---|---|---|---|---|---|---|
| Rheology | | | | | | | | | |
| Viscosity at 20 s$^{-1}$ (up/down) (mPa s) | 142/103 | 771/528 | 105/84 | 42.7/38.1 | 102/85 | 131/106 | 125/97 | 128/123 | 122/118 |
| Separation (%) | | | | | | | | | |
| 1 week RT | 32% T | 11% T | 12% T | 30% M | 13% T | 12% T | 10% T | 9% T | 9% T |
| 3 weeks RT | 39% T | 16% T | 22% T | 41% M | 24% T | 23% T | 22% T | 20% T | 20% T |
| 3 months RT | 43% T | 20% T | 28% T | 45% M | 30% T | 31% T | 30% T | 28% T | 29% T |
| 1 week 40° C. | 36% T | 14% T | 19% T | 42% M | 19% T | 16% T | 17% T | 11% T | 13% T |
| 3 weeks 40° C. | 39% T | 17% T | 23% T | 46% M | 25% T | 22% T | 21% T | 21% T | 19% T |
| 3 months 40° C. | 43% T | 20% T | 29% T | 50% M | 28% T | 26% T | 24% T | 24% T | 24% T |

*Example according to the invention; T = top, B = bottom, T&B = top & bottom, M = middle The above results demonstrate that samples according to the invention containing different ester based oils (7C, 7E-71) show better gravitational stability than a recipe with a similar viscosity but without microspheres (7A). Recipe 7B shows that a significantly higher viscosity is required to achieve a better gravitational stability without the addition of microspheres. Recipe 7D shows that without any rheological modifier the use of microspheres alone results in high gravitational separation.

Example 8

Formulations were prepared with the following recipes:

| Component (g/l) | 8A | 8B | 8C* | 8D* | 8E* | 8F* | 8G | 8H |
|---|---|---|---|---|---|---|---|---|
| a) Tebuconazole | 200 | 200 | 200 | 200 | 200 | 200 | 200 | 200 |
| c) Expancel ® 091 DE 40d30 | | | 2.2 | | | | | |
| c) 3M ® glass bubbles K1 | | | | 10.0 | | | | |
| c) Dualite ® E135-040D | | | | | 11.0 | | | 11.0 |
| c) 3M ® glass bubbles S22 | | | | | | 20.0 | | |
| c) 3M ® glass bubbles S32 | | | | | | | 34.0 | |
| b) Thixatrol ® ST | 9 | 10 | 8 | 8 | 8 | 8 | 8 | |
| b) Pangel ® B20 | 4.5 | 5 | 4 | 4 | 4 | 4 | 4 | |
| e) Rhodacal ® 60/BE | 40 | 40 | 40 | 40 | 40 | 40 | 40 | 40 |
| g) Berol ® 827 | 40 | 40 | 40 | 40 | 40 | 40 | 40 | 40 |
| f) Lucramul ® HOT 5902 | 50 | 50 | 50 | 50 | 50 | 50 | 50 | 50 |
| d) Rapeseed oil methyl ester (to 1 l) | ~605 | ~604 | ~543 | ~536 | ~536 | ~527 | ~514 | ~545 |

§as 10% pre-gel in rapeseed oil methyl ester
*Example according to the invention The method of preparation used was according to Method 1 described previously. The rheological modifier gelled concentrate was prepared as a Thixatrol® ST 10% w/w pre-gel in rapeseed oil methyl ester. A 150 ml sample was heated to a temperature of 68° C. and periodic medium shear mixing applied during cooling to 40° C.

The Pangel® B20 was directly mixed into the sample with an Ultra Turrax® prior to the addition of the low density particles (c). 3M® glass bubbles S32 have a particle size of 40 μm and a density of 0.32 g/cm$^3$.

Results:

The recipes 8C to 8F all contain a rheological modifier and microspheres with a density less than 0.27 g/cm$^3$ according to the invention and have a lower viscosity than recipe 8B and lower gravitational separation than 8A and 8B with only a rheological additive. Recipe 8G containing a rheological modifier and microspheres with a density of 0.32 g cm$^{-3}$ leads to a formulation with low phase separation but undesired higher "up" viscosity than samples 8A to 8F showing that microspheres with a low density less than 0.27 g/cm$^3$ are important for a low viscosity. Recipe 8H contains microspheres but no rheological modifier and showed high gravitational separation and poor stability.

| | 8A | 8B | 8C* | 8D* | 8E* | 8F* | 8G | 8H |
|---|---|---|---|---|---|---|---|---|
| Rheology | | | | | | | | |
| Viscosity at 20 s$^{-1}$ (up/down) (mPa s) | 360/ 268 | 602/ 404 | 436/ 314 | 463/ 330 | 381/ 278 | 516/ 381 | 620/ 388 | 76.0/ 50.7 |
| Separation (%) | | | | | | | | |
| 1 week RT | 11% T | 10% T | 2% B | 3% B | 4% B | 3% B | 3% B | 10% M |
| 3 weeks RT | 18% T | 17% T | 9% B | 9% B | 9% B | 9% B | 6% B | 20% M |
| 3 months RT | 25% T | 19% T | 14% T | 14% B | 14% B | 15% B | 15% B | 35% M |
| 1 week 40° C. | 18% T | 14% T | 7% B | 8% B | 6% B | 10% B | 6% B | 46% M |
| 3 weeks 40° C. | 21% T | 17% T | 11% | 12% B | 9% B | 14% B | 9% B | 49% M |
| 3 months 40° C. | 30% T | 17% T | 16% | 16% B | 14% B | 17% B | 13% B | 57% M |

*Example according to the invention; T = top, B = bottom, T&B = top & bottom, M = middle Example 9

Formulations were prepared with the following recipes:

| Component (g/l) | 9A | 9B | 9C* |
|---|---|---|---|
| a) Tembotrione | 100 | 100 | 100 |
| e) Triton ® GR 7 ME | 100 | 100 | 100 |
| g) Emulsogen ® EL 400 | 25 | 25 | 25 |

-continued

| Component (g/l) | 9A | 9B | 9C* |
|---|---|---|---|
| g) Genapol ® X-060 | 100 | 100 | 100 |
| b) Bentone ® 38 | 0 | 12.5 | 10 |
| g) propylene carbonate | | 1.25 | 1 |
| c) 3M ® Glass Bubbles K15 | 0 | 0 | 10 |
| d) Rapeseed oil methyl ester (to 1 l) | ~626.15 | ~620.65 | ~563.08 |

§ as 5% pre-gel in rapeseed oil methyl ester
*Example according to the invention The method of preparation used was according to Method 3 described previously.

| | 9A | 9B | 9C* |
|---|---|---|---|
| Rheology | | | |
| Viscosity at 20 s$^{-1}$ (up/down) (mPa s) | 83/73 | 1453/405 | 946/428 |
| Separation (%) | | | |
| 1 week RT | 26% T | 0% | 0% |
| 1 week 40° C. | 39% T | 0% | 0% |
| 4 weeks RT | 36% T | 0% | 0% |
| 4 weeks 40° C. | 45% T | 5% T | 0% |

*Example according to the invention; T = top, B = bottom, T&B = top & bottom

Results:

Without both low density particles and rheological modifier high gravitational separation was found (9A). Addition of rheological modifier alone at a level sufficient to produce a strong gel structure resulted in low gravitational separation but also a high viscosity (9B). Addition of low density particles with a reduced level of rheological modifier resulted in zero gravitational separation and a lower viscosity (9C) according to the invention.

Example 10

Formulations were prepared with the following recipes:

| Component (g/l) | 10A | 10B | 10C | 10D* | 10E* | 10F* | 10G |
|---|---|---|---|---|---|---|---|
| a) Diflufenican | 150 | 150 | 150 | 150 | 150 | 150 | 150 |
| e) Rhodacal ® 60BE | 40 | 40 | 40 | 40 | 40 | 40 | 40 |
| f) Genapol ® XM-060 | 100 | 100 | 100 | 100 | 100 | 100 | 100 |
| g) Emulsogen ® EL400 | 40 | 40 | 40 | 40 | 40 | 40 | 40 |
| c) 3M ® Glass Bubbles K15 | 0 | 0 | 0 | 11.8 | 12.5 | 13.2 | 10.2 |
| b) Bentone ® 38 | 15 | 40 | 60 | 20 | 30 | 40 | 0 |
| h) Propylene carbonat | 1.5 | 4 | 6 | 2 | 3 | 4 | 0 |
| d) Solvesso ® 200ND (to 1 l) | ~670 | ~626 | ~604 | ~620 | ~609 | ~598 | ~644 |

*Example according to the invention

The method of preparation used was according to Method 3 described previously.

| | 10A | 10B | 10C | 10D* | 10E* | 10F* | 10G |
|---|---|---|---|---|---|---|---|
| Rheology | | | | | | | |
| Viscosity at 20 s$^{-1}$ (up/down) (mPa s) | 53.1/44.5 | 231/147 | 1259/907 | 107/73 | 245/118 | 523/401 | 36/34 |
| Separation (%) | | | | | | | |
| 1 week RT | 60% T | 5% T | 0% | 0% | 0% | 0% | 65%? |
| 1 week 40° C. | 70% T | 5% T | 1% T | 0% | 0% | 0% | 85% T&B |
| 4 weeks RT | 70% T | 7% T | 0% | 0% | 0% | 0% | 75% T&B |
| 4 weeks 40° C. | 72% T | 7% T | 2% T | 0% | 0% | 0% | 85% T&B |

*Example according to the invention; T = top, B = bottom, T&B = top & bottom

Results:

Without both low density particles and rheological modifier high gravitational separation was found (10A). Addition of rheological modifier alone at a level sufficient to produce a strong gel structure resulted in low gravitational separation but also a high viscosity (10B, 10C). Addition of low density particles with a reduced level of rheological modifier resulted in zero gravitational separation and a lower viscosity (10D/E/F) according to the invention. Addition of low density particles at a level sufficient to balance out the density of the solids content without any rheological modifier results in strong phase separation at top and bottom (10G).

Example 11

Formulations were prepared with the following recipes:

| Component (g/l) | 11A | 11B | 11C | 11D* | 11E* | 11F |
|---|---|---|---|---|---|---|
| a) Thiencarbazone-methyl | 100 | 100 | 100 | 100 | 100 | 100 |
| e) Rhodacal ® 60BE | 40 | 40 | 40 | 40 | 40 | 40 |
| f) Genapol ® XM-060 | 100 | 100 | 100 | 100 | 100 | 100 |
| g) Emulsogen ® EL400 | 40 | 40 | 40 | 40 | 40 | 40 |
| c) 3M ® Glass Bubbles K15 | | | | 7.8 | 8.6 | 6.2 |
| h) Silcolapse ® 482 | 1 | 1 | 1 | 1 | 1 | 1 |
| b) Bentone ® 38 | 20 | 30 | 60 | 20 | 30 | 0 |
| h) Propylene carbonate | 2 | 3 | 6 | 2 | 3 | 0 |

-continued

| Component (g/l) | 11A | 11B | 11C | 11D* | 11E* | 11F |
|---|---|---|---|---|---|---|
| d) Solvesso ® 200ND (to 1 l) | ~697 | ~687 | ~653 | ~673 | ~661 | ~697 |

*Example according to the invention

The method of preparation used was according to Method 3 described previously.

| | 11A | 11B | 11C | 11D* | 11E* | 11F |
|---|---|---|---|---|---|---|
| Rheology | | | | | | |
| Viscosity at 20 s$^{-1}$ (up/down) (mPa s) | 67.8/ 66.2 | 263.4/ 118.2 | 1593/ 1098 | 83.9/ 75.4 | 214.6/ 120.3 | 23.1/ 19.4 |
| Separation (%) | | | | | | |
| 1 week RT | 60% T | <5% T | 0% | 0% | 0% | 0%? |
| 1 week 40° C. | 70% T | <5% T | 1% T | 0% | 0% | 0%? |
| 4 weeks RT | 70% T | 5% T | 0% | 0% | 0% | 0%? |
| 4 weeks 40° C. | 72% T | 5-10% T | 1-2% T | 0% | 0% | 0%? |

*Example according to the invention; T = top, B = bottom, T&B = top & bottom

Results:

Without both low density particles and rheological modifier very high gravitational separation was found (11A). Addition of rheological modifier alone at a level sufficient to produce a strong gel structure resulted in low gravitational separation but also a high viscosity (11B, 11C). Addition of low density particles with a reduced level of rheological modifier resulted in zero gravitational separation and a lower viscosity (11D, 11E) according to the invention. Addition of low density particles at a level sufficient to balance out the density of the solids content without any rheological modifier results in a metastable formulation (11F).

Example 12

Formulations were prepared with the following recipes:

| Components [g/L] | 12A | 12B | 12C* | 12D | 12E |
|---|---|---|---|---|---|
| a) Acetamiprid | 150.00 | 150.00 | 150.00 | 150.00 | 150.00 |
| e) Rhodacal ® 60BE | 12.00 | 12.00 | 12.00 | 12.00 | 12.00 |
| g) Berol ® 829 | 30.00 | 30.00 | 30.00 | 30.00 | 30.00 |
| f) Lucramul ® HOT 5902 | 30.00 | 30.00 | 30.00 | 30.00 | 30.00 |
| b) Bentone ® 38 | | | | 12.36 | 12.36 | 22.00 |
| g) Propylene carbonate | | | | 4.95 | 4.95 | 9.00 |
| c) Expancel ® 551DE20d60 | | | 4.50 | 4.50 | |
| d) Crodamol ® OP | 352.00 | 319.75 | 314.80 | 347.05 | 342.11 |
| d) Edenor ® MESU (to 1 l) | ~354.0 | ~321.4 | ~315.8 | ~348.4 | ~342.8 |

*Example according to the invention

The method of preparation used was according to Method 2 described previously. Bentone 38 was used as a 7.5% pre-gelled preparation in ethylhexyl palmitate/rapeseed oil methyl ester 50:50 and activated with propylene carbonate. High shear mixing was applied for 20 minutes and a temperature of 40° C. was achieved.

| | 12A | 12B | 12C* | 12D | 12E |
|---|---|---|---|---|---|
| Rheology | | | | | |
| Viscosity at 20 s-1 (up/down) [mPa s] | 188/158 | 304/212 | 1030/363 | 985/319 | 1228/894 |
| Separation (%) | | | | | |
| 4 weeks RT | 19% T | 0% | 0% | 8% T | 6% T |
| 4 weeks 40° C. | 17% T | 2% B | 0% | 8% T | 6% T |
| 21 weeks RT | 23% T | 2% T&B | 0% | 20% T | 6% T |
| 21 weeks 40° C. | 20% T | 2% T&B | 0% | 17% T | 9% T |

*Example according to the invention; T = top, B = bottom, T&B = top & bottom

Results:

Without both low density particles and rheological modifier highest gravitational separation was found (12A). Addition of rheological modifier alone at a level sufficient to produce a strong gel structure resulted in lower gravitational separation but also a high viscosity (12D, 12E). Addition of low density particles with a reduced level of rheological modifier resulted in zero gravitational separation and a lower viscosity (12C) according to the invention. Addition of low density particles at a level sufficient to balance out the density of the solids content without any rheological modifier results in separation at both top and bottom (12B).

Example 13

Formulations were prepared with the following recipes:

| Components [g/l] | 13A | 13B | 13C* | 13D* | 13E |
|---|---|---|---|---|---|
| a) Spirotetramat | 150.0 | 150.0 | 150.0 | 150.0 | 150.0 |
| e) Rhodacal 60BE | 12.0 | 12.0 | 12.0 | 12.0 | 12.0 |
| g) Berol ® 829 | 30.0 | 30.0 | 30.0 | 30.0 | 30.0 |
| f) Lucramul ® HOT 5902 | 30.0 | 30.0 | 30.0 | 30.0 | 30.0 |
| c) Dualite ® E130-055D | | 10.0 | 10.0 | | |
| c) 3M ® Glass Bubbles S22 | | | | 15.0 | |
| b) Bentone ® 38 | | | 14.0 | 12.0 | 22.0 |
| g) Propylencarbonate | | | 6.0 | 5.0 | 9.0 |
| d) Crodamol ® OP | 346.0 | 313.0 | 308.0 | 311.8 | 337.0 |
| d) Edenor ® MESU (to 1 l) | ~348.0 | ~315.0 | ~308.0 | ~312.6 | ~338.0 |

*Example according to the invention

The method of preparation used was according to method 2 described previously. Bentone 38 was used as a 7.5% pre-gelled preparation in ethylhexyl palmitate/rapeseed oil methyl ester 50:50 and activated with propylene carbonate. High shear mixing was applied for 20 minutes and a temperature of 40° C. was achieved.

| | 13A | 13B | 13C* | 13D* | 13E |
|---|---|---|---|---|---|
| Rheology | | | | | |
| Viscosity at 20 s-1 (up/down) [mPa s] | 157/128 | 246/ 212 | 633/ 247 | 560/ 334 | 1621/ 960 |
| Separation (%) | | | | | |
| 4 weeks RT | 18% T | 7% B | 0% | 0% | 0% |
| 4 weeks 40° C. | 28% T | 7% B | 0% | 1% T | 0% |
| 6 weeks RT | 29% T | 7% B | 0% | 0% | 0% |

-continued

|  | 13A | 13B | 13C* | 13D* | 13E |
|---|---|---|---|---|---|
| 6 weeks 40° C. | 28% T | 10% B | 0% | 2% T | 3% T |
| 8 weeks RT | 29% T | 9% B | 0% | 0% | 0% |
| 8 weeks 40° C. | 29% T | 15% B | 0% | 2% T | 6% T |

*Example according to the invention; T = top, b = bottom, T&B = top & bottom

Results:

Without both low density particles and rheological modifier high gravitational separation was found (13A). Addition of rheological modifier alone at a level sufficient to produce a strong gel structure resulted in very low gravitational separation but also a very high viscosity (13E). Addition of low density particles with a reduced level of rheological modifier resulted in zero or very low gravitational separation and a lower viscosity (13C, 13D) according to the invention. Addition of low density particles at a level sufficient to balance out the density of the solids content without any rheological modifier results in separation at the bottom (13B).

Example 14

Formulations were prepared with the following recipes:

| Components [g/l] | 14A | 14B | 14C* | 14D* | 14E* | 14F* | 14G |
|---|---|---|---|---|---|---|---|
| a) Thiacloprid | 150.0 | 150.0 | 150.0 | 150.0 | 150.0 | 150.0 | 150.0 |
| e) Rhodacal ® 60BE | 12.0 | 12.0 | 12.0 | 12.0 | 12.0 | 12.0 | 12.0 |
| g) Berol ® 829 | 30.0 | 30.0 | 30.0 | 30.0 | 30.0 | 30.0 | 30.0 |
| f) Lucramul ® HOT 5902 | 30.0 | 30.0 | 30.0 | 30.0 | 30.0 | 30.0 | 30.0 |
| b) Aerosil ® R972 |  |  | 23.5 | 23.5 | 27.7 | 27.7 | 41.5 |
| c) Dualite ® E130-055D |  |  |  | 13.0 |  | 13.0 |  |
| c) Expancel ® 551DE20d60 |  | 6.5 | 6.5 |  | 6.5 |  |  |
| d) Crodamol ® OP | 355.0 | 299.4 | 294.8 | 298.4 | 294.0 | 297.6 | 337.9 |
| d) Edenor ® MESU (to 1 l) | 357.0 | 300.9 | 296.2 | 299.9 | 295.4 | 299.1 | 339.8 |

*Example according to the invention

The method of preparation used was according to method 2 described previously.

Aerosil® R972 was used as a 13% pre-gelled preparation in ethylhexyl palmitate/rapeseed oil methyl ester 50:50. High shear mixing was applied for 20 minutes and a temperature of 40° C. was achieved.

|  | 14A | 14B | 14C* | 14D* | 14E* | 14F* | 14G |
|---|---|---|---|---|---|---|---|
| Rheology |  |  |  |  |  |  |  |
| Visco @20 up/down [mPa s] | 148/128 | 208/182 | 521/466 | 514/470 | 787/681 | 724/603 | 1208/1099 |
| Separation (%) |  |  |  |  |  |  |  |
| 4 weeks RT | 28% T | 14% B | 0% | 0% | 0% | 3% T | 0% |
| 4 weeks 40° C. | 39% T | 15% B | 0% | 6% T | 0% | 6% T | 0% |
| 6 weeks RT | 28% T | 14% B | 0% | 0% | 0% | 3% T | 0% |
| 6 weeks 40° C. | 39% T | 15% B | 0% | 6% T | 0% | 6% T | 0% |
| 8 weeks RT | 31% T | 16% B | 4% T | 9% T | 0% | 8% T | 10% T |
| 8 weeks 40° C. | 41% T | 20% B | 5% T | 6% T | 0% | 9% T | 10% T |

*Example according to the invention; T = top, B = bottom, T&B = top & bottom

After 18 w of storage no significant changes in phase separation have been observed.

Results:

Without both low density particles and rheological modifier high gravitational separation was found (14A). Addition of rheological modifier alone at a level sufficient to produce a strong gel structure resulted in low gravitational separation but also a high viscosity (14G). Addition of low density particles with a reduced level of rheological modifier resulted in zero or very low gravitational separation and a lower viscosity (14C, 14D, 14E, 14F) according to the invention. Addition of low density particles at a level sufficient to balance out the density of the solids content without any rheological modifier results in high separation at the bottom (14B).

Example 15

Formulations were prepared with the following recipes:

| Components [g/l] | 15A | 15B | 15C* | 15D* | 15E | 15F* | 15G |
|---|---|---|---|---|---|---|---|
| a) Thiacloprid | 150.0 | 150.0 | 150.0 | 150.0 | 150.0 | 150.0 | 150.0 |
| e) Rhodacal ® 60BE | 15.0 | 15.0 | 15.0 | 15.0 | 15.0 | 15.0 | 15.0 |
| g) Berol ® 829 | 37.5 | 37.5 | 37.5 | 37.5 | 37.5 | 37.5 | 37.5 |
| f) Lucramul ® HOT 5902 | 37.5 | 37.5 | 37.5 | 37.5 | 37.5 | 37.5 | 37.5 |
| b) Bentone ® 38 |  |  | 9.9 | 11.5 |  | 10.6 | 18.1 |
| g) Propylencarbonate |  |  | 4.0 | 4.6 |  | 4.3 | 7.3 |
| c) Dualite ® E130-055D |  | 13.0 | 13.0 | 13.0 |  |  |  |
| c) Expancel ® 551DE20d60 |  |  |  |  |  | 6.5 | 6.5 |
| d) Crodamol ® OP | 347.5 | 304.5 | 300.5 | 299.9 | 300.9 | 296.7 | 340.2 |
| d) Edenor ® MESU (to 1 l) | ~348.8 | ~305.3 | ~300.8 | ~300.0 | ~301.6 | ~296.8 | ~340.5 |

*Example according to the invention

The method of preparation used was according to method 2 described previously.

Bentone® 38 was used as a 7.5% pre-gelled preparation in ethylhexyl palmitate/rapeseed oil methyl ester 50:50 and activated with propylene carbonate. High shear mixing was applied for 20 minutes and a temperature of 40° C. was achieved.

|  | 15A | 15B | 15C* | 15D* | 15E | 15F* | 15G |
|---|---|---|---|---|---|---|---|
| Rheology |  |  |  |  |  |  |  |
| Viscosity at 20 s−1 (up/down) [mPa s] | 145/ 134 | 254/ 270 | 252/ 186 | 247/ 185 | 157/ 123 | 466/ 309 | 1246/ 567 |
| Separation (%) |  |  |  |  |  |  |  |
| 4 weeks RT | 24% T | 0% | 0% | 0% | 10% B | 0% | 0% |
| 4 weeks 40° C. | 34% T | 0% | 0% | 0% | 15% B | 0% | 4% T |
| 6 weeks RT | 24% T | 0% | 0% | 0% |  |  |  |
| 6 weeks 40° C. | 34% T | 0% | 0% | 0% |  |  |  |
| 7 weeks RT |  |  |  |  | 13% B | 0% | 3% T |
| 7 weeks 40° C. |  |  |  |  | 17% B | 3% B | 6% T |
| 8 weeks RT | 31% T | 0% | 10% T | 0% |  |  |  |
| 8 weeks 40° C. | 34% T | 12% T | 5% T | 0% |  |  |  |

*Example according to the invention; T = top, B = bottom, T&B = top & bottom

Results:

Without both low density particles and rheological modifier high gravitational separation was found (15A). Addition of rheological modifier alone at a level sufficient to produce a strong gel structure resulted in low gravitational separation but also a high viscosity (15G). Addition of low density particles with a reduced level of rheological modifier resulted in zero gravitational separation and a low viscosity (15C, 15D, 15F) according to the invention. Addition of low density particles at a level sufficient to balance out the density of the solids content without any rheological modifier eventually results in separation either at the bottom (15E) or top (15B).

Example 16

Formulations were prepared with the following recipes:

| Components [g/l] | 16A | 16B | 16C* | 16D* | 16E | 16F* | 16G |
|---|---|---|---|---|---|---|---|
| a) Imidacloprid | 150.0 | 150.0 | 150.0 | 150.0 | 150.0 | 150.0 | 150.0 |
| e) Rhodacal ® 60BE | 12.0 | 12.0 | 12.0 | 12.0 | 12.0 | 12.0 | 12.0 |
| g) Berol ® 829 | 30.0 | 30.0 | 30.0 | 30.0 | 30.0 | 30.0 | 30.0 |
| f) Lucramul ® HOT 5902 | 30.0 | 30.0 | 30.0 | 30.0 | 30.0 | 30.0 | 30.0 |
| b) Bentone ® 38 |  |  | 14.8 | 16.5 |  | 16.5 | 22.0 |
| g) Propylencarbonate |  |  | 5.9 | 6.6 |  | 6.6 | 9.0 |
| c) Dualite ® E130-055D |  | 12.0 | 12.0 | 12.0 |  |  |  |
| c) Expancel ® 551DE20d60 |  |  |  |  | 6.0 | 6.0 |  |
| d) Crodamol ® OP | 358.0 | 318.4 | 312.5 | 311.8 | 315.0 | 308.4 | 349.4 |
| d) Edenor ® MESU (to 1 l) | ~360.0 | ~320.0 | ~313.3 | ~312.5 | ~316.5 | ~309.0 | ~349.9 |

*Example according to the invention

The method of preparation used was according to method 2 described previously.

Bentone® 38 was used as a 7.5% pre-gelled preparation in ethylhexyl palmitate/rapeseed oil methyl ester 50:50 and activated with propylene carbonate. High shear mixing was applied for 20 minutes and a temperature of 40° C. was achieved.

|  | 16A | 16B | 16C* | 16D* | 16E | 16F* | 16G |
|---|---|---|---|---|---|---|---|
| Rheology |  |  |  |  |  |  |  |
| Viscosity at 20 s−1 (up/down) [mPa s] | 70/70 | 120/108 | 270/ 200 | 550/ 290 | 117/ 103 | 369/ 240 | 683/ 480 |
| Separation (%) |  |  |  |  |  |  |  |
| 4 weeks RT | 35% T | 0% | 0% | 0% | 18% B | 0% | 12% T |
| 4 weeks 40° C. | 38% T | 0% | 0% | 0% | 5% T&B | 0% | 16% T |
| 6 weeks RT |  |  |  |  | 22% B | 0% | 18% T |
| 6 weeks 40° C. |  |  |  |  | 5% T&B | 0% | 16% T |
| 7 weeks RT | 37% T | 0% | 0% | 0% |  |  |  |
| 7 weeks 40° C. | 38% T | 0% | 0% | 0% |  |  |  |
| 10 weeks RT |  |  |  |  | 22% B | 3% B | 19% T |
| 10 weeks 40° C. |  |  |  |  | 9% T&B | 5% B | 16% T |
| 18 weeks RT | 38% T | 0% | 0% | 0% |  |  |  |
| 18 weeks 40° C. | 39% T | 2% T | 0% | 0% |  |  |  |

-continued

|  | 16A | 16B | 16C* | 16D* | 16E | 16F* | 16G |
|---|---|---|---|---|---|---|---|
| 112 weeks RT§ | 44% T | 14% T&B | 3% T | 2% T | 10% B | 3% B | 34% T |
| 112 weeks 40° C.§ | 47% T | 13% T&B | 3% T | 6% T | 15% B | 2% B | 20% T |

*Example according to the invention; T = top, B = bottom, T&B = top & bottom
§some liquid evaporated over time.

Results:

Without both low density particles and rheological modifier high gravitational separation was found (16A). Addition of rheological modifier alone at a level sufficient to produce a strong gel structure resulted in high gravitational separation and a high viscosity (16G). Addition of low density particles with a reduced level of rheological modifier resulted in almost zero gravitational separation and a lower viscosity (16C, 16D, 16F) according to the invention. Addition of low density particles at a level sufficient to balance out the density of the solids content without any rheological modifier results in separation at both top and bottom (16B, 16E).

Example 17

Formulations were prepared with the following recipes:

| Components [g/l] | 17A | 17B | 17C* | 17D | 17E* | 17F |
|---|---|---|---|---|---|---|
| a) Imidacloprid | 150.0 | 150.0 | 150.0 | 150.0 | 150.0 | 150.0 |
| e) Rhodacal ® 60BE | 12.0 | 12.0 | 12.0 | 12.0 | 12.0 | 12.0 |
| g) Berol ® 829 | 30.0 | 30.0 | 30.0 | 30.0 | 30.0 | 30.0 |
| f) Lucramul ® HOT 5902 | 30.0 | 30.0 | 30.0 | 30.0 | 30.0 | 30.0 |
| b) Aerosil ® R972 |  |  | 23.5 |  | 27.7 | 37.3 |
| c) Dualite ® E130-055D |  | 12.0 | 12.0 |  |  |  |
| c) Expancel ® 551DE20d60 |  |  |  |  | 6.0 | 6.0 |
| d) Crodamol ® OP | 358.0 | 318.3 | 313.7 | 315.0 | 309.6 | 350.7 |
| d) Edenor ® MESU (to 1 l) | ~360.0 | ~319.8 | ~315.2 | ~316.5 | ~311.1 | ~352.6 |

*Example according to the invention.

The method of preparation used was according to method 2 described previously.

Aerosil® R972 was used as a 13% pre-gelled preparation in ethylhexyl palmitate/rapeseed oil methyl ester 50:50. High shear mixing was applied for 20 minutes and a temperature of 40° C. was achieved.

| Rheology | 17A | 17B | 17C* | 17D | 17E* | 17F |
|---|---|---|---|---|---|---|
| Viscosity at 20 s-1 (up/down) [mPa s] | 70/70 | 131/113 | 310/277 | 254/235 | 648/514 | 1055/876 |

| Separation (%) | 17A | 17B | 17C | 17D | 17E | 17F |
|---|---|---|---|---|---|---|
| 4 weeks RT | 14% T | 22% T&B | 0% | 11% T | 0% | 7% T |
| 4 weeks 40° C. | 18% T | 20% T&B | 0% | 6% T | 0% | 7% T |
| 6 weeks RT | 33% T | 25% T&B | 7% T | 16% T | 0% | 14% T |
| 6 weeks 40° C. | 24% T | 22% T&B | 0% | 6% T | 0% | 7% T |
| 10 weeks RT | 40% T | 25% T&B | 7% T | 16% T | 12% T | 18% T |
| 10 weeks 40° C. | 29% T | 22% T&B | 7% T | 13% T | 0% | 7% T |

*Example according to the invention; T = top, B = bottom, T&B = top & bottom

After 18 w of storage no significant changes in phase separation have been observed.

Results:

Without both low density particles and rheological modifier high gravitational separation was found (17A). Addition of rheological modifier alone at a level sufficient to produce a strong gel structure resulted in low gravitational separation but also a high viscosity (17F). Addition of low density particles with a reduced level of rheological modifier resulted in zero or low gravitational separation and a lower viscosity (17C, 17E) according to the invention. Addition of low density particles at a level sufficient to balance out the density of the solids content without any rheological modifier results in separation at the top (17D) or both top and bottom (17B).

Example 18

Formulations were prepared with the following recipes:

| Components [g/l] | 18A | 18B | 18C* | 18D* | 18E |
|---|---|---|---|---|---|
| a) Tetraniliprole | 100.0 | 100.0 | 100.0 | 100.0 | 100.0 |
| e) Rhodacal ® 60BE | 20.0 | 20.0 | 20.0 | 20.0 | 20.0 |
| g) Berol ® 829 | 20.0 | 20.0 | 20.0 | 20.0 | 20.0 |
| f) Lucramul ® HOT 5902 | 33.3 | 33.3 | 33.3 | 33.3 | 33.3 |
| b) Bentone ® 38 |  |  | 16.5 | 16.5 | 24.7 |
| g) Propylencarbonate |  |  | 6.6 | 6.6 | 9.9 |
| c) Expancel ® 461DE40d60 |  | 4.0 | 4.0 |  |  |
| c) Dualite ® E130-055D |  |  |  | 9.0 |  |
| d) Crodamol ® OP | 370.5 | 341.9 | 342.3 | 334.2 | 361.2 |
| d) Edenor ® MESU (to 1 l) | ~374.9 | ~345.9 | ~344.8 | ~337.3 | ~364.2 |

*Example according to the invention.

The method of preparation used was according to method 2 described previously. Bentone® 38 was used as a 7.5% pre-gelled preparation in ethylhexyl palmitate/rapeseed oil methyl ester 50:50 and activated with propylene carbonate. High shear mixing was applied for 20 minutes and a temperature of 40° C. was achieved.

|  | 18A | 18B | 18C* | 18D* | 18E |
|---|---|---|---|---|---|
| Rheology |  |  |  |  |  |
| Viscosity at 20 s-1 (up/down) [mPa s] | 304/266 | 363/303 | 688/552 | 712/598 | 659/571 |

-continued

|  | 18A | 18B | 18C* | 18D* | 18E |
|---|---|---|---|---|---|
| Separation (%) | | | | | |
| 4 weeks RT | 17% T | 5% B | 0% | 0% | 3% T |
| 4 weeks 40° C. | 18% T | 6% B | 0% | 0% | 10% T |
| 8 weeks RT | 27% T | 10% B | 0% | 0% | 13% T |
| 8 weeks 40° C. | 26% T | 8% B | 2% T | 3% T | 16% T |
| 18 weeks RT | 37% T | 12% B | 0% | 0% | 19% T |
| 18 weeks 40° C. | 27% T | 10% B | 2% T | 6% T | 26% T |

*Example according to the invention; T = top, B = bottom, T&B = top & bottom

Results:

Without both low density particles and rheological modifier high gravitational separation was found (18A). Addition of rheological modifier alone at a level sufficient to produce a strong gel structure resulted in significant gravitational separation but also a high viscosity (18E). Addition of low density particles with a reduced level of rheological modifier resulted in zero or very low gravitational separation and an acceptable viscosity (18C, 18D) according to the invention. Addition of low density particles at a level sufficient to balance out the density of the solids content results in separation at the bottom (18B).

Example 19

Formulations were prepared with the following recipes:

| Components [g/l] | 19A | 19B | 19C* | 19D* | 19E | 19F |
|---|---|---|---|---|---|---|
| a) Flubendiamid | 100.0 | 100.0 | 100.0 | 100.0 | 100.0 | 100.0 |
| e) Rhodacal ® 60BE | 10.0 | 10.0 | 10.0 | 10.0 | 10.0 | 10.0 |
| g) Berol ® 829 | 25.0 | 25.0 | 25.0 | 25.0 | 25.0 | 25.0 |
| f) Lucramul ® HOT 5902 | 25.0 | 25.0 | 25.0 | 25.0 | 25.0 | 25.0 |
| b) Bentone ® 38 | | | 14.8 | 16.5 | 12.4 | 24.7 |
| g) Propylencarbonate | | 5.9 | 6.6 | 4.9 | 9.9 | |
| c) Glass Bubbles K1 | | 9.0 | 9.0 | 9.0 | | |
| d) Crodamol ® OP | 378.5 | 348.3 | 342.4 | 341.7 | 374.3 | 369.4 |
| d) Edenor ® MESU (to 1 l) | ~381.0 | ~350.4 | ~343.7 | ~343.0 | ~376.1 | ~370.5 |

*Example according to the invention

The method of preparation used was according to method 2 described previously. Bentone® 38 was used as a 7.5% pre-gelled preparation in ethylhexyl palmitate/rapeseed oil methyl ester 50:50 and activated with propylene carbonate (33% of Bentone content). High shear mixing was applied for 20 minutes and a temperature of 40° C. was achieved.

|  | 19A | 19B | 19C* | 19D* | 19E | 19F |
|---|---|---|---|---|---|---|
| Rheology | | | | | | |
| Viscosity at 20 s−1 (up/down) [mPa s] | 39/36 | 51/49 | 138/118 | 153/181 | 89/82 | 267/213 |
| Separation (%) | | | | | | |
| 1 week RT | 61% T | 27% T&B | 0% | 0% | 21% T | 5% T |
| 1 week 40° C. | 62% T | 29% T&B | 0% | 0% | 33% T | 7% T |
| 2 weeks RT | 63% T | 34% T&B | 0% | 0% | 37% T | 12% T |
| 2 weeks 40° C. | 65% T | 42% T&B | 0% | 0% | 44% T | 16% T |
| 4 weeks RT | 66% T | 43% T&B | 0% | 0% | 50% T | 20% T |
| 4 weeks 40° C. | 67% T | 44% T&B | 0% | 0% | 51% T | 29% T |
| 8 weeks RT | 68% T | 43% T&B | 0% | 0% | 55% T | 31% T |
| 8 weeks 40° C. | 68% T | 44% T&B | 0% | 5% T | 54% T | 33% T |
| 18 weeks RT | 68% T | 53% T&B | 0% | 0% | 55% T | 32% T |
| 18 weeks 40° C. | 68% T | 45% T&B | 5% T | 12% T | 57% T | 38% T |

*Example according to the invention; T = top, B = bottom, T&B = top & bottom

Results:

Without both low density particles and rheological modifier very high gravitational separation was found (19A). Addition of rheological modifier alone at a level sufficient to produce a strong gel structure resulted in very high gravitational separation but also a higher viscosity (19E, 19F). Addition of low density particles with a reduced level of rheological modifier resulted in zero or low gravitational separation and a low viscosity (19C, 19D) according to the invention. Addition of low density particles at a level sufficient to balance out the density of the solids content without any rheological modifier results in separation at top and bottom (19B).

Example 20

Formulations were prepared with the following recipes:

| Components [g/l] | 20A | 20B | 20C* | 20D* | 20E | 20F |
|---|---|---|---|---|---|---|
| a) Flubendiamide | 100.0 | 100.0 | 100.0 | 100.0 | 100.0 | 100.0 |
| e) Synperonic ® A7 | 7.5 | 7.5 | 7.5 | 7.5 | 7.5 | 7.5 |
| f) Lucramul ® HOT 5902 | 25.0 | 25.0 | 25.0 | 25.0 | 25.0 | 25.0 |
| e) Morwet ® D 425 | 2.5 | 2.5 | 2.5 | 2.5 | 2.5 | 2.5 |
| g) Arlatone ® TV | 50.0 | 50.0 | 50.0 | 50.0 | 50.0 | 50.0 |
| g) Vulkanox ® BHT | 1.0 | 1.0 | 1.0 | 1.0 | 1.0 | 1.0 |
| b) Aerosil ® 972V | | | 5.1 | 5.1 | 10.3 | 20.5 |
| c) Expancel ® 551DE20d60 | | 3.0 | 3.0 | 3.5 | | |
| d) sunflower oil (to 1 l) | ~794.0 | ~747.5 | ~744.6 | ~736.9 | ~788.2 | ~782.5 |

*Example according to the invention

The method of preparation used was according to method 2 described previously. Aerosil® R972 was used as a 13% pre-gelled preparation in ethylhexyl palmitate/rapeseed oil methyl ester 50:50. High shear mixing was applied for 20 minutes and a temperature of 40° C. was achieved.

| | 20A | 20B | 20C* | 20D* | 20E | 20F |
|---|---|---|---|---|---|---|
| Rheology | | | | | | |
| Viscosity at 20 s−1 (up/down) [mPa s] | 199/192 | 224/207 | 280/252 | 288/279 | 301/266 | 503/455 |

-continued

| | 20A | 20B | 20C* | 20D* | 20E | 20F |
|---|---|---|---|---|---|---|
| Separation (%) | | | | | | |
| 1 w RT | 22% T | 7% T | 0% | 0% | 7% T | 3% T |
| 1 w 40° C. | 16% T | 0% | 0% | 0% | 9% T | 3% T |
| 2 w RT | 34% T | 8% T | 2% T | 0% | 12% T | 3% T |
| 2 w 40° C. | 27% T | 7% T | 2% T | 0% | 10% T | 3% T |
| 4 w RT | 40% T | 15% T | 6% T | 0% | 17% T | 7% T |
| 4 w 40° C. | 36% T | 9% T | 9% T | 0% | 15% T | 5% T |
| 8 w RT | 47% T | 15% T | 8% T | 0% | 22% T | 7% T |
| 8 w 40° C. | 36% T | 12% T | 9% T | 0% | 20% T | 7% T |
| 18 w RT | 50% T | 24% T | 14% T | 2% B | 29% T | 10% T |
| 18 w 40° C. | 45% T | 12% T | 11% T | 3% B | 24% T | 7% T |

*Example according to the invention; T = top, B = bottom, T&B = top & bottom

Results:

Without both low density particles and rheological modifier very high gravitational separation was found (20A). Addition of rheological modifier alone at a level sufficient to produce a strong gel structure resulted in high gravitational separation (20E) and/or a higher viscosity (20E, 20F). Addition of low density particles with a reduced level of rheological modifier resulted in zero or low gravitational separation and a low viscosity (20C, 20D) according to the invention. Addition of low density particles at a level sufficient to balance out the density of the solids content without any rheological modifier results in separation at the top (20B).

Example 21

Formulations were prepared with the following recipes:

| Components [g/l] | 21A | 21B | 21C* | 21D* | 21E | 21F |
|---|---|---|---|---|---|---|
| a) Acetamiprid | 125.0 | 125.0 | 125.0 | 125.0 | 125.0 | 125.0 |
| e) Rhodacal ® 60BE | 10.0 | 10.0 | 10.0 | 10.0 | 10.0 | 10.0 |
| g) Berol ® 829 | 25.0 | 25.0 | 25.0 | 25.0 | 25.0 | 25.0 |
| f) Lucramul ® HOT 5902 | 25.0 | 25.0 | 25.0 | 25.0 | 25.0 | 25.0 |
| b) Bentone ® 38 | | | 12.4 | 14.8 | 12.4 | 20.6 |
| g) Propylencarbonate | | | 4.9 | 5.9 | 4.9 | 8.2 |
| c) Expancel ® 551DE20d60 | | 4.0 | 4.0 | 4.0 | | |
| d) Crodamol ® OP | 363.8 | 335.1 | 330.2 | 329.2 | 358.8 | 355.5 |
| d) Edenor ® MESU (to 1 l) | ~368.0 | ~339.0 | ~333.4 | ~332.3 | ~362.4 | ~358.7 |

*Example according to the invention

The method of preparation used was according to method 2 described previously. Bentone® 38 was used as a 7.5% pre-gelled preparation in ethylhexyl palmitate/rapeseed oil methyl ester 50:50 and activated with propylene carbonate. High shear mixing was applied for 20 minutes and a temperature of 40° C. was achieved.

| | 21A | 21B | 21C* | 21D* | 21E | 21F |
|---|---|---|---|---|---|---|
| Rheology | | | | | | |
| Viscosity at 20 s−1 (up/down) [mPa s] | 149/127 | 218/166 | 336/245 | 433/332 | 202/147 | 625/479 |
| Separation (%) | | | | | | |
| 1 week RT | 15% T | 0% | 0% | 0% | 2% T | 1% T |
| 1 week 40° C. | 16% T | 2% B | 0% | 0% | 3% T | 2% T |
| 2 weeks RT | 17% T | 0% | 0% | 0% | 5% T | 2% T |
| 2 weeks 40° C. | 16% T | 2% B | 0% | 0% | 9% T | 3% T |
| 4 weeks RT | 20% T | 1% B | 0% | 0% | 12% T | 5% T |

-continued

|           | 21A   | 21B  | 21C* | 21D* | 21E   | 21F  |
|-----------|-------|------|------|------|-------|------|
| 4 weeks 40° C.  | 17% T | 2% B | 0%   | 0%   | 14% T | 5% T |
| 8 weeks RT      | 22% T | 1% B | 0%   | 0%   | 17% T | 7% T |
| 8 weeks 40° C.  | 18% T | 2% B | 0%   | 0%   | 16% T | 8% T |
| 17 weeks RT     | 24% T | 1% B | 0%   | 0%   | 17% T | 9% T |
| 17 weeks 40° C. | 19% T | 2% B | 0%   | 2% T | 17% T | 8% T |

*Example according to the invention; T = top, B = bottom, T&B = top & bottom

Results:

Without both low density particles and rheological modifier high gravitational separation was found (21A). Addition of rheological modifier alone at a level sufficient to produce a strong gel structure resulted in high gravitational separation (21E) and/or a higher viscosity (21F). Addition of low density particles with a reduced level of rheological modifier resulted in almost zero gravitational separation and a low viscosity (21C, 21D) according to the invention. Addition of low density particles at a level sufficient to balance out the density of the solids content without any rheological modifier results in separation at the bottom (21B).

Example 22

Formulations were prepared with the following recipes:

| Components [g/l]      | 22A    | 22B    | 22C*   | 22D*   | 22E    | 22F    |
|-----------------------|--------|--------|--------|--------|--------|--------|
| a) Thiacloprid        | 100.0  | 100.0  | 100.0  | 100.0  | 100.0  | 100.0  |
| h) Deltamethrin       | 10.0   | 10.0   | 10.0   | 10.0   | 10.0   | 10.0   |
| e) Synperonic ® A7    | 10.0   | 10.0   | 10.0   | 10.0   | 10.0   | 10.0   |
| f) Lucramul ® HOT 5902| 33.3   | 33.3   | 33.3   | 33.3   | 33.3   | 33.3   |
| e) Morwet ® D 425     | 3.3    | 3.3    | 3.3    | 3.3    | 3.3    | 3.3    |
| g) Arlatone ® TV      | 66.7   | 66.7   | 66.7   | 66.7   | 66.7   | 66.7   |
| g) Vulkanox ® BHT     | 1.3    | 1.3    | 1.3    | 1.3    | 1.3    | 1.3    |
| b) Aerosil ® 972      |        |        | 5.1    | 8.2    | 10.3   | 20.5   |
| c) Expancel ® 551DE20d60 |     | 3.0    | 3.0    | 3.0    |        |        |
| d) sunflower oil (to 1 l) | ~753.5 | ~707.0 | ~704.1 | ~702.4 | ~747.7 | ~742.0 |

*Example according to the invention

The method of preparation used was according to method 2 described previously. Aerosil® R972 was used as a 13% pre-gelled preparation in ethylhexyl palmitate/rapeseed oil methyl ester 50:50. High shear mixing was applied for 20 minutes and a temperature of 40° C. was achieved.

|   | 22A | 22B | 22C* | 22D* | 22E | 22F |
|---|-----|-----|------|------|-----|-----|
| Rheology | | | | | | |
| Viscosity at 20 s−1 (up/down) [mPa s] | 236/208 | 344/230 | 301/277 | 360/319 | 317/290 | 502/434 |
| Separation (%) | | | | | | |
| 1 week RT        | 10% T | 0%     | 0%    | 0%    | 2% T  | 2% T  |
| 1 week 40° C.    | 13% T | 0%     | 0%    | 0%    | 5% T  | 3% T  |
| 2 weeks RT       | 17% T | 0%     | 0%    | 0%    | 7% T  | 5% T  |
| 2 weeks 40° C.   | 30% T | 0%     | 0%    | 0%    | 9% T  | 5% T  |
| 4 weeks RT       | 29% T | 2% B   | 0%    | 0%    | 10% T | 7% T  |
| 4 w 40° C.       | 30% T | 0%     | 0%    | 0%    | 14% T | 8% T  |
| 8 weeks RT       | 44% T | 7% T&B | 0%    | 7% T  | 17% T | 10% T |
| 8 weeks 40° C.   | 39% T | 0%     | 0%    | 2% T  | 21% T | 10% T |
| 16 weeks RT      | 55% T | 14% T&B| 11% T | 7% T  | 32% T | 15% T |
| 16 weeks 40° C.  | 45% T | 13% T&B| 17% T | 12% T | 29% T | 13% T |

*Example according to the invention; T = top, B = bottom, T&B = top & bottom

Results:

Without both low density particles and rheological modifier very high gravitational separation was found (22A). Addition of rheological modifier alone at a level sufficient to produce a strong gel structure resulted in medium to high gravitational separation (22E) and/or a higher viscosity (22F). Addition of low density particles with a reduced level of rheological modifier resulted in zero or low gravitational separation and a low viscosity (22C, 22D) according to the invention. Addition of low density particles at a level sufficient to balance out the density of the solids content without any rheological modifier results in separation at top and bottom (22B).

Example 23

Formulations were prepared with the following recipes:

| Components [g/l] | 23A | 23B | 23C* | 23D* | 23E | 23F |
|---|---|---|---|---|---|---|
| a) Flubendiamide | 150.00 | 150.00 | 150.00 | 150.00 | 150.00 | 150.00 |
| e) Synperonic ® A7 | 11.25 | 11.25 | 11.25 | 11.25 | 11.25 | 11.25 |
| f) Lucramul ® HOT 5902 | 37.50 | 37.50 | 37.50 | 37.50 | 37.50 | 37.50 |
| e) Morwet ® D 425 | 37.50 | 37.50 | 37.50 | 37.50 | 37.50 | 37.50 |
| g) Arlatone ® TV | 75.00 | 75.00 | 75.00 | 75.00 | 75.00 | 75.00 |
| g) Vulkanox ® BHT | 1.50 | 1.50 | 1.50 | 1.50 | 1.50 | 1.50 |
| g) Cyclohexanone | 22.50 | 22.50 | 22.50 | 22.50 | 22.50 | 22.50 |
| g) Attagel ® 50 | 22.50 | 22.50 | 22.50 | 22.50 | 22.50 | 22.50 |
| b) Bentone ® 34 | | | 5.13 | 5.13 | 10.26 | 20.51 |
| g) Propylencarbonate | | | | 1.69 | 3.38 | 6.77 |
| c) Expancel ® 551DE20d60 | | 5.00 | 5.00 | 4.50 | | |
| d) sunflower oil (to 1 l) | ~651.7 | ~574.2 | 569.6 | ~577.4 | ~642.6 | ~633.6 |

*Example according to the invention

The method of preparation used was according to method 2 described previously. Bentone® 34 was used as a 10% pre-gelled preparation in sunflower oil and activated with propylene carbonate. High shear mixing was applied for 20 minutes and a temperature of roughly 40° C. was achieved.

| | 23A | 23B | 23C* | 23D* | 23E | 23F |
|---|---|---|---|---|---|---|
| Rheology | | | | | | |
| Viscosity at 20 s−1 (up/down) [mPa s] | 260/226 | 347/297 | 547/411 | 623/505 | 714/564 | 947/726 |
| Separation (%) | | | | | | |
| 1 week RT | 11% T | 0% | 0% | 0% | 0% | 0% |
| 1 week 40° C. | 10% T | 0% | 0% | 0% | 0% | 0% |
| 2 weeks RT | 18% T | 0% | 0% | 0% | 0% | 0% |
| 2 weeks 40° C. | 13% T | 0% | 0% | 0% | 7% T | 7% T |
| 3 weeks RT | 18% T | 0% | 0% | 0% | 0% | 0% |
| 3 weeks 40° C. | 13% T | 0% | 0% | 0% | 9% T | 7% T |
| 4 weeks RT | 18% T | 0% | 0% | 0% | 0% | 0% |
| 4 weeks 40° C. | 15% T | 4% T | 0% | 0% | 11% T | 7% T |
| 72 weeks RT | 57% T | 23% T | 11% T | 10% T | 29% T | 24% T |
| 72 weeks 40° C. | 46% T | 20% T&B | 17% T&B | 13% T | 34% T | 26% T |

*Example according to the invention; T = top, B = bottom, T&B = top & bottom

Results:

Without both low density particles and rheological modifier high gravitational separation was found (23A). Addition of rheological modifier alone at a level sufficient to produce a strong gel structure resulted in some gravitational separation and also a higher viscosity (23E, 23F). Addition of low density particles with a reduced level of rheological modifier resulted in zero gravitational separation and a low viscosity (23C, 23D) according to the invention. Addition of low density particles at a level sufficient to balance out the density of the solids content without any rheological modifier results in separation at the top (23B).

Example 24

Formulations were prepared with the following recipes:

| Components [g/l] | 24A | 24B | 24C* | 24D | 24E |
|---|---|---|---|---|---|
| a) Spirotetramat | 150.00 | 150.00 | 150.00 | 150.00 | 150.00 |
| e) Synperonic ® A7 | 11.25 | 11.25 | 11.25 | 11.25 | 11.25 |
| f) Lucramul ® HOT 5902 | 37.50 | 37.50 | 37.50 | 37.50 | 37.50 |
| e) Morwet ® D 425 | 3.75 | 3.75 | 3.75 | 3.75 | 3.75 |
| g) Arlatone ® TV | 75.00 | 75.00 | 75.00 | 75.00 | 75.00 |
| g) Vulkanox ® BHT | 1.50 | 1.50 | 1.50 | 1.50 | 1.50 |
| g) Citric acid anh. | 0.75 | 0.75 | 0.75 | 0.75 | 0.75 |
| g) Sipemat ® 22S | 22.50 | 22.50 | 22.50 | 22.50 | 22.50 |
| b) Bentone ® 34 | | | 5.13 | 10.26 | 20.51 |
| g) Propylencarbonate | | | 1.69 | 3.38 | 6.77 |
| c) Expancel ® 551DE20d60 | | 3.00 | 3.00 | | |
| d) sunflower oil (to 1 l) | ~674.1 | ~627.6 | ~623.1 | ~665.0 | ~656.0 |

*Example according to the invention

The method of preparation used was according to method 2 described previously. Bentone® 34 was used as a 10% pre-gelled preparation in sunflower oil and activated with propylene carbonate. High shear mixing was applied for 20 minutes and a temperature of roughly 40° C. was achieved.

| | 24A | 24B | 24C | 24D | 24E |
|---|---|---|---|---|---|
| Rheology | | | | | |
| Viscosity at 20 s−1 (up/down) [mPa s] | 196/169 | 217/191 | 306/238 | 367/309 | 521/426 |
| Separation (%) | | | | | |
| 1 w RT | 0% | 0% | 0% | 0% | 0% |
| 1 w 40° C. | 10% T | 0% | 0% | 0% | 0% |
| 2 w RT | 19% T | 17% T&B | 0% | 7% T | 0% |
| 2 w 40° C. | 17% T | 10% T&B | 0% | 6% T | 5% T |
| 3 w RT | 29% T | 20% T&B | 0% | 7% T | 0% |
| 3 w 40° C. | 27% T | 10% T&B | 0% | 8% T | 5% T |
| 4 w RT | 38% T | 33% T&B | 0% | 7% T | 0% |
| 4 w 40° C. | 32% T | 11% T&B | 0% | 10% T | 5% T |

*Example according to the invention; T = top, B = bottom, T&B = top & bottom

Results:

Without both low density particles and rheological modifier high gravitational separation was found (24A). Addition of rheological modifier alone at a level sufficient to produce a strong gel structure resulted in some gravitational separation and also a higher viscosity (24D, 24E). Addition of low density particles with a reduced level of rheological modifier resulted in zero gravitational separation and a low viscosity (24C) according to the invention. Addition of low density particles at a level sufficient to balance out the density of the solids content without any rheological modifier results in separation at top and bottom (24B).

The invention claimed is:

1. An oil-based suspension concentrate comprising at least one agrochemical active compound which is solid at room temperature, low-density particles having a density of 0.01 to 0.16 g/cm$^3$, at least 300 g/l of one or more water immiscible fluids and less than 50 g/l of water, wherein the density is the density of the individual low-density particles, and wherein the low-density particle size (d50) ranges from 20 to 90 µm,
wherein the low-density particles are hollow microspheres composed of glass, ceramic, or (co-)polymeric materials,
further comprising 1 to 80 g/l of one or more rheological modifier selected from the group consisting of hydrophobic and hydrophilic fumed and precipitated silica particles, gelling clays, hydrogenated castor oil (trihydroxystearin), castor oil organic derivatives, and combinations thereof.

2. The oil-based suspension concentrate according to claim 1, comprising 0.01 to 50 g/l of the low-density particles.

3. The oil-based suspension concentrate according to claim 1, wherein the gelling clay is selected from one or more of the following: bentonite, hectorite, laponite, attapulgite, sepiolite, smectite, hydrophobically/organophilic modified bentonite, and organically modified hectorite.

4. The oil-based suspension concentrate according to claim 1, comprising 2 to 60 g/l of the one or more rheological modifier.

5. A product comprising one or more oil-based suspension concentrates according to claim 1 for application of one or more agrochemical active compounds to plants and/or a habitat thereof.

6. An oil-based suspension concentrate comprising:
a) 2 to 500 g/l of one or more agrochemical active compound which is solid at room temperature,
b) 1 to 80 g/l of one or more rheological modifier selected from the group consisting of hydrophobic and hydrophilic fumed and precipitated silica particles, gelling clays, hydrogenated castor oil (trihydroxystearin), castor oil organic derivatives, and combinations thereof.
c) 0.01 to 50 g/l of low-density particles, wherein the low-density particles are hollow microspheres composed of glass, ceramic or (co-)polymeric materials,
d) 300 to 900 g/l of one or more water immiscible fluid and e) 5 to 250 g/l of one or more non-ionic surfactant or dispersing aid and/or at least one anionic surfactant or dispersing aid,
wherein the low-density particles c) have a density of 0.01 to 0.16 g/cm$^3$,
wherein the density is the density of the individual low-density particles, and wherein the low-density particle size (d50) rangers from 20 and 90 µm.

7. The oil-based suspension concentrate according to claim 6, wherein the one or more agrochemical active compound a) is selected from the group consisting of fungicides, bactericides, insecticides, acaricides, nematicides, molluscicides, herbicides, plant growth regulators, plant nutrients, repellents, and combinations thereof.

8. The oil-based suspension concentrate according to claim 6, further comprising one or more of the following:
f) 1 to 400 g/l of one or more penetration promoters, wetting agents, spreading agents and/or retention agents, g) 0.02 to 400 g/l of one or more additives from the group consisting of emulsifying agents, solvents, antifoam agents, preservatives, antioxidants, colourants, activators for rheological modifiers and/or inert filling materials, h) 1 to 800 g/l of one or more agrochemical active compound which is liquid or in solution in liquid phase at room temperature.

9. The oil-based suspension concentrate according to claim 5, comprising 2 to 60 g/l of the one or more rheological modifier.

10. A process for preparation of the oil-based suspension concentrate according to claim 6, wherein in a first step (1) the solid phase comprising the solid agrochemical active compound or compounds a) and the continuous fluid phase comprising the immiscible fluid or fluids d) are mixed, followed by a second step (2) wherein the resulting suspension is ground and the components b) a process for preparation and e) are added and a third step (3) wherein component c) is added.

11. Process according to claim 10, wherein a pre-gel of components b) and d) is prepared which is added to the resulting suspension after step (2).

12. Process according to claim 10, wherein the solid active ingredient particles have an average particle size of below 20 µm.

13. A process for preparation of the oil-based suspension concentrate according to claim 5, wherein in a first step (1) the solid phase comprising the solid agrochemical active compound or compounds a) and the continuous fluid phase comprising the immiscible fluid or fluids d) and the other components listed in groups b) and e) are mixed, followed by a second step (2) wherein the resulting suspension is ground and a third step (3) wherein component c) is added.

* * * * *